(12) United States Patent
Taylor

(10) Patent No.: US 7,739,338 B2
(45) Date of Patent: *Jun. 15, 2010

(54) SYSTEM AND METHOD FOR ENCODING AND VERIFYING THE IDENTITY OF A SENDER OF ELECTRONIC MAIL AND PREVENTING UNSOLICITED BULK EMAIL

(75) Inventor: Michael Walsh Taylor, Las Cruces, NM (US)

(73) Assignee: Data Laboratory, L.L.C., Las Cruces, NM (US)

( * ) Notice: Subject to any disclaimer, the term of this patent is extended or adjusted under 35 U.S.C. 154(b) by 790 days.

This patent is subject to a terminal disclaimer.

(21) Appl. No.: 11/425,703

(22) Filed: Jun. 21, 2006

(65) Prior Publication Data

US 2007/0011253 A1   Jan. 11, 2007

Related U.S. Application Data

(60) Provisional application No. 60/692,784, filed on Jun. 21, 2005.

(51) Int. Cl.
*G06F 15/16* (2006.01)
*H04L 9/00* (2006.01)
(52) U.S. Cl. .................... 709/206; 709/219; 380/44
(58) Field of Classification Search ............ 709/206, 709/217–219; 380/30, 44, 277, 281, 286
See application file for complete search history.

(56) References Cited

U.S. PATENT DOCUMENTS

| 6,546,515 | B1 * | 4/2003 | Vary et al. ............... 714/746 |
| 6,769,016 | B2 | 7/2004 | Rothwell et al. |
| 6,868,498 | B1 | 3/2005 | Katsikas |
| 7,028,312 | B1 * | 4/2006 | Merrick et al. ........... 719/330 |
| 7,290,035 | B2 * | 10/2007 | Mattathil .................. 709/206 |
| 2004/0054887 | A1 * | 3/2004 | Paulsen et al. ........... 713/154 |
| 2004/0181571 | A1 | 9/2004 | Atkinson et al. |
| 2004/0181585 | A1 | 9/2004 | Atkinson et al. |

* cited by examiner

*Primary Examiner*—Peling A Shaw
(74) *Attorney, Agent, or Firm*—Charles A. Lemaire; Lemaire Patent Law Firm, P.L.L.C.

(57) ABSTRACT

The present invention provides a method and system for preventing unsolicited bulk email (UBE). Spammers sending UBE typically capitalize on the weakness of SMTP. The present invention affixes a subscriber key value to the local part of an email address. The email and associated key value are sent to a server where the subscriber key value, and subscriber and recipient email addresses are associated and stored into a database. Once stored, the email is sent to the ultimate recipient. A recipient is in possession of a subscriber key value can use this key value to sign an email they intend to send to the original subscriber/sender. Recipient will then send this signed email to a server where the association between the subscriber and the subscriber key value is verified. Once verified the email is sent to the subscriber. In some embodiments, the verification process is not controlled by a server.

17 Claims, 21 Drawing Sheets

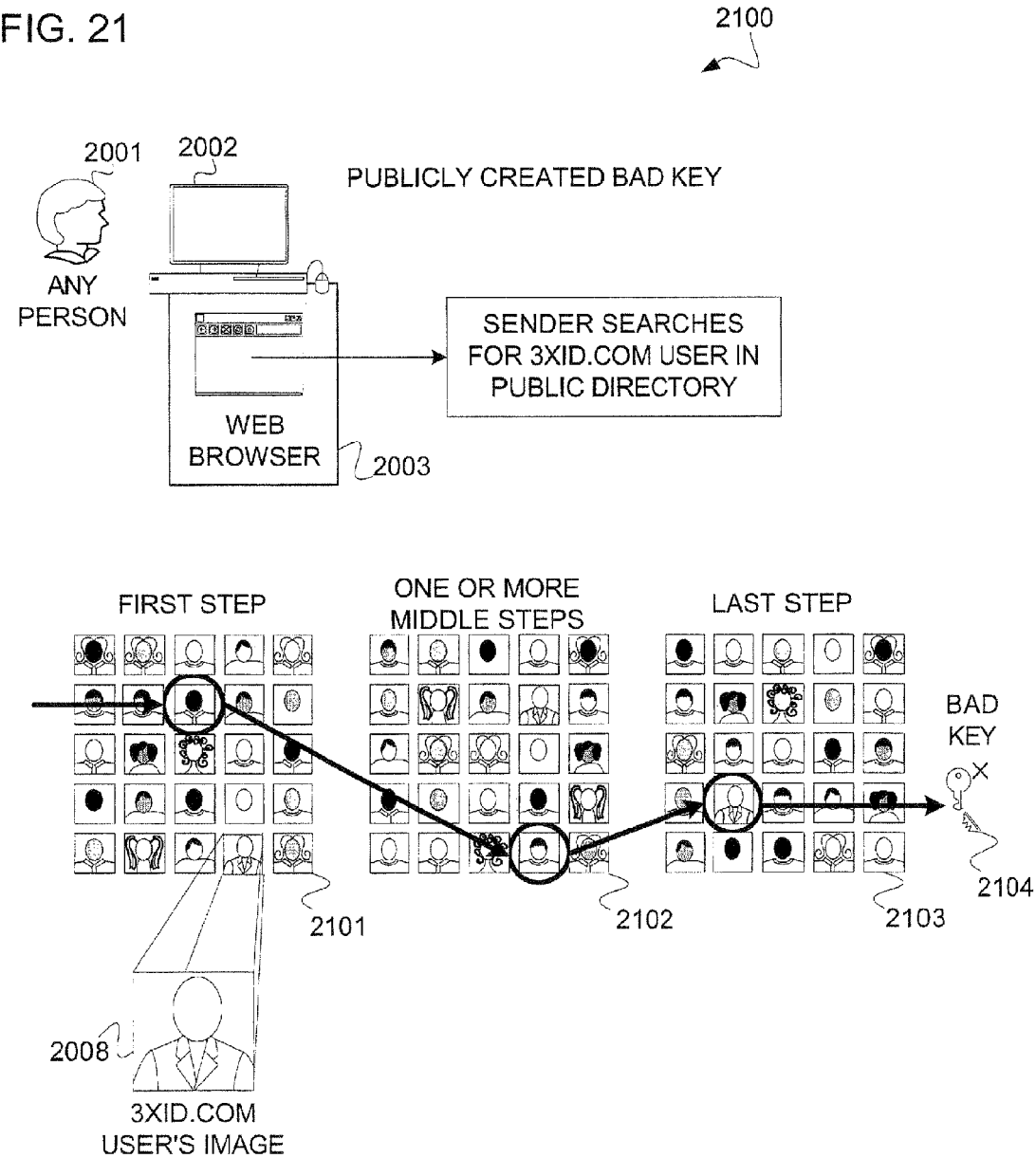

SYSTEM AND METHOD FOR ENCODING AND VERIFYING THE IDENTITY OF A SENDER OF ELECTRONIC MAIL AND PREVENTING UNSOLICITED BULK EMAIL

CROSS-REFERENCE TO RELATED APPLICATION

This application claims benefit of U.S. Provisional Patent Application No. 60/692,784 filed Jun. 21, 2005, which is hereby incorporated by reference in its entirety. This application is also related to U.S. patent application Ser. No. 11/425,701 (now U.S. Pat. No. 7,660,861) entitled "System and Method for Verifying the Identity of a Sender of Electronic Mail and Preventing Unsolicited Bulk Email," filed on Jun. 21, 2006, which is incorporated by reference in its entirety.

FIELD OF THE INVENTIONS

This invention relates to the field of a computer-implemented system and method for verifying the identity of a sender of electronic mail for the purpose of preventing unsolicited bulk email.

COPYRIGHT NOTICE

This patent document contains copyrightable computer software elements including but not limited to source code, flow charts and screen displays. The following notice shall apply to these elements: Copyright® Data Laboratory L.L.C.

LIMITED WAIVER OF COPYRIGHT

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

Electronic mail (email) has become the communication method of choice throughout the business world as well as for the general public. In a typical enterprise environment, a mail server (e.g., UNIX SendMail) has a local mail delivery agent or client (typically . . . /bin/mail on UNIX systems) that stores an incoming email on a local file system and delivers it to an end user via Post Office Protocol (POP3), Internet Message Access Protocol (IMAP) or a command line program. Such agents typically provide the basic functionality of logging in an email message and copying that message to a client machine's mail spool. Internet-based client-server messaging systems include, for example, Mozilla Thunderbird™, Microsoft Outlook™, Pegasus™, and Eudora™, which provide email, contact management, calendaring, group scheduling, Web access, task list management, and information management, integrated in an easy-to-use and customizable environment.

The rapid increase in the number of users of the internet has made email an attractive advertising medium. Unfortunately, however, email is now frequently used as the medium for widespread marketing broadcasts of messages to a large number of email addresses. Large service providers and corporations are particularly susceptible to this practice, which is commonly known as spamming, or the sending of unsolicited bulk email (UBE), commonly called spam. The economic cost associated with the sending of UBE is massive. First, it is estimated that 40% of all internet traffic in the United States is UBE. Companies expend considerable time and money removing UBE from their mail servers, purchasing software to filter it, and employing a variety of other techniques to defeat it. By some estimates UBE costs corporations over $10 billion dollars a year to control. (See *Spam's Cost To Business Escalates: Bulk Email Threatens Communication Arteries*, Johnathan Krim, Washington Post, Mar. 13, 2003 at A01.)

The desire to reduce spam has led to both regulatory and technical solutions. Several states have passed legislation that ban the practice of sending spam email and impose criminal sanctions for violations. (See e.g., Rev. Code of Wa. 19.190.020; CAN-SPAM ACT of 2003, 15 U.S.C. §§7701-13; 18 U.S.C. §1037.) Technical solutions include a number of techniques. The most common one is to filter UBE by blocking emails from particular email addresses that originate such messages. This approach, however, is vulnerable to rapid changes to the source of the UBE (e.g., changes to the "From" field in the email header), which is relatively easy because most spam is generated by automated means. Such approaches also typically require the set up and maintenance of a complex filtering mechanism.

In order to understand the technological solution to UBE, it is first necessary to understand the technology utilized in the sending and receiving of email. UBE at root exploits some of the technological loopholes associated with the sending and retrieval of email. Most email systems that send email over the internet use the Simple Mail Transfer Protocol (SMTP) to send messages from one server to another; the messages can then be retrieved with an email client using either the aforementioned POP3 or IMAP. In addition, SMTP is generally used to send messages from a mail client to a mail server. This is why is it important that one specify both POP3 or IMAP and the SMTP server when one configures one's email client-server messaging systems. SMTP, POP3 and IMAP reside at the application layer of the TCP/IP protocol stack.

Senders of UBE (Spammers) typically exploit the fact that the SMTP does not always validate or verify the identity of the sender of email (the loophole). Specifically, while the receiver of email is verified by one of many applications residing at the application layer of the TCP/IP protocol stack, the identity of the actual sender is rarely verified. Put another way, SMTP can only verify the sender if it knows the sender to begin with; for example, in the case where a person has a mailbox account housed within the SMTP server. As a result, senders of UBE are free to put whatever name they see fit in the sender or "From" field of an email header and are free to impersonate whomever they so choose. (See RFC 822 (outlining the header line requirements for an email).) SMTP is one of the most widely used, if not the most widely used, protocol relied upon when sending email. Accordingly, the inability of SMTP to reliably and consistently verify the identity of the sender of email is a loophole that is exploited on a massive scale by those sending UBE.

Spammers exploit the above-described loophole through a variety of techniques. For example, spammers may use a program called an alpha-numerical generator to create random versions of the local portion of an email address. (See RFC 2822 (outlining the form and parts of an email address).) These random local portions are then paired with a domain name and used to fill the "From" field of the UBE. Another method employed by spammers is to employ address harvesting (Trolling) programs that sift or sniff through streams of data, such as, but not limited to, web pages looking for the "@" symbol followed by ".com" or some other high-level domain extension. Once found, these valid email addresses are captured and used to fill the "From" field of UBE. Still other spammers may just leave the "From" field blank. Finally, some spammers simply set up their own SMTP server and send bulk email unencumbered. This is because SMTP has no method to indicate a sender has been verified, and no method to indicate a sender is known to the recipient of the email.

Various solutions have been devised to deal with UBE. One solution is to devise smart filters that analyze the text and/or subject headings of an email, looking for certain key words, and based upon the probability that these words would occur in an email that is UBE, rejecting or filtering such emails. (See U.S. Pat. No. 6,769,016 B2 ("the Rothwell et al. Patent").) Another solution is to force the sender of an email to solve a trivial computational puzzle prior to being allowed to send email to a particular mail server. (See U.S. patent application Ser. No. 10/684,020 (Publication No. US 2004/0181571A1) ("the Atkinson et al. Application").) This computational puzzle may take the form of the sender having to type in the text from an image displayed to them. Still another solution is to require that a sender pay a small fee (e.g., a penny) for each email they send. Such a fee would provide an economic disincentive to the spammer who sends out several million pieces of UBE. Another solution would require the sender's computer to solve some computational puzzle such as factoring a large number using a large amount of computer processing time which would add up to a prohibitive amount of process time for large bulk email operations. One other solution is to require that all emails be associated with or mapped to some particular mail server (an Authorized Server), such that email purportedly coming from a domain would have to be validated by determining if the email did in fact come from an Authorized server for that domain. Still another solution is to create a list of accepted and non-accepted senders of email, and to compare the incoming email against this list. (See U.S. Pat. No. 6,868,498 B1 ("the Katsikas Patent").)

Another solution to the problem of UBE is to use encryption, and in particular digital signatures, to verify the identity of the sender of email. Yahoo! Inc. proposes a system called a Domain-based email Authentication Using Encryption Public-Keys Advertised in the DNS (DomainKeys). Under the DomainKeys system, public key/private key encryption is used in the form of a digital signature included in the header of the email. (See *RSA & Public Key Cryptography*, Richard A. Mollin, CRC Press 2002.) In particular, this digital signature is a private encryption key that is included with the email. Once a recipient receives such an email, they query a domain name server (DNS) containing the corresponding public key. This public key is used to verify the identity of the sender of the email. Of note is the fact that the DomainKey system does not modify the "From" and "To" fields of the email header, rather it inserts the DomainKey signature and related information above the standard email header containing the "From", "To", and Subject fields within proprietary head tags that are not part of the SMTP protocol. Moreover, this system utilizes a DNS to store and verify the public key/private key relationships.

One problem with a DomainKey solution to the problem of UBE is that it is not cost effective, for it requires modifying DNS servers by implementing new encryption software on all the world's DNS servers. Such a solution also has an unintended side effect of slowing internet traffic, for all the world's email must be verified via this encryption algorithm.

There remains a need for a simple, yet cost effective way of restricting UBE within an enterprise email environment. The present invention addresses this need.

SUMMARY OF THE INVENTION

In some embodiments, the present invention provides a method, computer-readable medium, and system for stopping unsolicited bulk email through the use of an automatically or manually generated alpha-numeric value embedded within the local portion of an email address. This value, called a 3xID key value, is, in some embodiments, associated with a particular sender of email and, in turn, is used to identify and validate the sender's identity when he or she decides to send an email to a recipient or 3xID subscriber.

In some embodiments, the present invention includes a computerized method for validating the identity of a sender of an email that includes receiving an email header with an email address, modifying a local part of the email address by affixing a 3xID key value to the local part of the email address, sending an email to a server using the modified email address, validating the identity of a sender of the email, associating the 3xID key and a recipient email address, removing the 3xID key value where necessary from the email header, storing this association into a database, and sending the email on to an ultimate recipient of the email.

In still further embodiments, a client-server messaging system for sending electronic mail is described that includes a first mail client operatively connected to a server via the internet, a second mail client operatively coupled to server via the internet, the first mail client operatively connected to the second mail client through a server and the internet, and a 3xID key value and associated sender, receiver email addresses stored in a database.

In some embodiments, a computer-readable medium is implemented having instructions for causing a computer to execute a method that includes receiving an email header with an email address, modifying a local part of the email address by affixing a 3xID key value to the local part of the email address, sending an email to a server using the modified email address, validating the identity of a sender of the email, associating the 3xID key value and a recipient email address, removing the 3xID key where necessary from the email header, storing this association into a database, and sending the email on to an ultimate recipient of the email.

BRIEF DESCRIPTION OF THE DRAWINGS

FIG. 21 is a schema 2100 that illustrates the unsuccessful use of a system of matrices to obtain a publicly created key.

DESCRIPTION OF EMBODIMENTS

Figure 1:
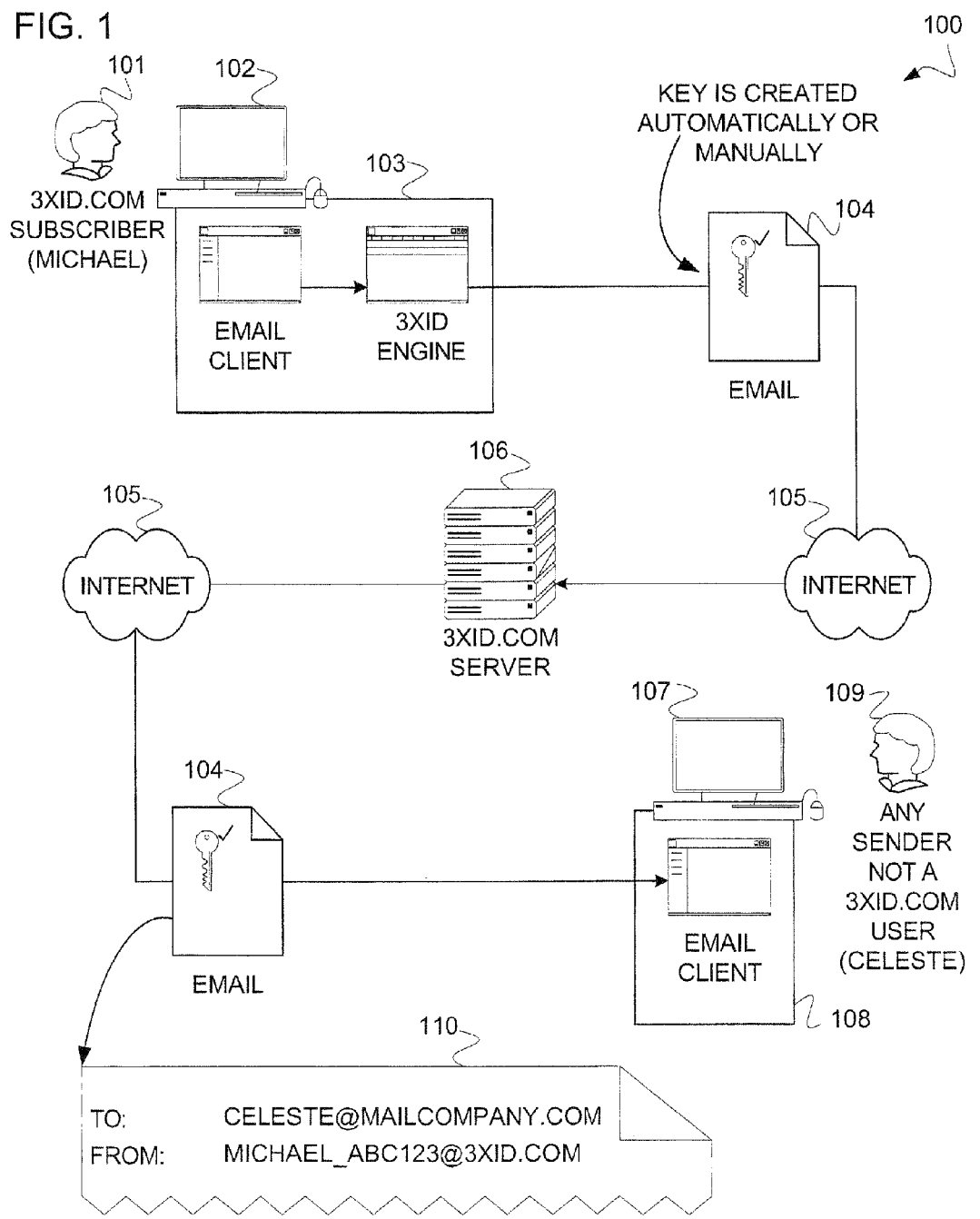
FIG. 1 is a network schema 100 describing one example of a trivial implementation of the present invention

In the following detailed description of the preferred embodiments, reference is made to the accompanying drawings that form a part hereof, and in which are shown, by way of illustration, specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple Figures. Signals and connections may be referred to by the same reference number or label, and the actual meaning will be clear from its use in the context of the description.

Overview

In some embodiments, the present invention provides a system and method for preventing unsolicited bulk email (UBE). Spammers who send UBE typically capitalize on the weakness of SMTP. The present invention adds a sender key or 3xID key to the local part, or mailbox name of an email address. A typical email address is usually formatted in the following manner:

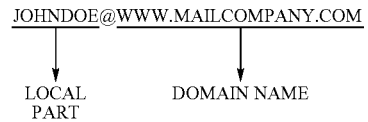

As described above, the local part, or mailbox name of the email is identifiable by being to the left of the "@" sign, while the domain name is identifiable by being to the right of the "@" sign. An email address employing one embodiment of the present invention has a 3xID key value inserted into the email address:

This 3xID key, in some embodiments, is generated randomly by an alpha-numeric character-generator application, and, in some embodiments, hashed, using a hashing function, or encrypted using symmetric encryption, asymmetric encryption, or a hybrid-crypto system. In some embodiments, this key is manually added by a sender or automatically added by a subscriber to the system and then hashed, using a hashing function, or encrypted using symmetric encryption, asymmetric encryption, or a hybrid-crypto system. In some embodiments, the 3xID key is created automatically or manually and not altered in any way (i.e., through hashing or encrypting). In some embodiments, once the key is inserted the email and associated key are then sent to a server where the sender key, and sender and recipient email addresses are associated and stored into a database. Once stored, the email is sent on to the ultimate recipient. If a recipient (e.g., a non-subscriber) is in possession of a sender key, they can then use this key to sign an email that they intend to send to the original sender (i.e., a subscriber) using a system employing the present method. Recipient will then send this signed email on to a server where the association between the sender and the sender key is verified. Once verified the email is sent on to the original sender.

This system and method can be further described as follows. In some embodiments, a subscriber to the system modifies the "From" field of an email header by inserting a sender key or 3xID key into the local portion of the sender email address. This email with the modified "From" field is then sent on to a mail server that associates the 3xID key with a particular email recipient's address. From this mail server, the email is forwarded to the recipient. The recipient is then free to send email to the sender using the same 3xID key and sending an email with the key to the mail server. The server will then compare the 3xID key and sender email address to verify the identity of the sender. If valid, the server will then forward the email on to the recipient. In still other embodiments, the send or "To" field is modified by inserting a 3xID key into the local portion of the sender email. In some embodiments, both the "From" and "To" fields have 3xID keys. In some embodiments, the present invention utilizes a server independent of a DNS to verify the 3xID key and sender relationship. The modification of the "To", and "From" addresses is done seamlessly by an application integrated with an email client, such as Outlook™, Pegasus™, or the like. As will be further discussed below, in some embodiments, this application is written in Java™, C#™, C++, Delphi™, or some other programming language known in the art.

A System for Preventing Unsolicited Bulk Email

In some embodiments, the above-described method is executed by a digital processing system or computer system that includes a processor, which may represent one or more processors and may include one or more conventional types of such processors (e.g., x86, x86-64), such as an AMD processor, or Intel Pentium processor or the like. In some embodiments, a memory is coupled to the processor by a bus. The memory may be a dynamic random access memory (DRAM) and/or may include static RAM (SRAM). The processor may also be coupled to other types of storage areas/memories (e.g., cache, Flash memory, disk, etc.), which could be considered as part of the memory or separate from the memory.

The bus further couples the processor to a display controller, a mass memory or some type of computer-readable media device, the modem or network interface, and an input/output (I/O) controller. Computer-readable media may include a magnetic, optical, magneto-optical, tape, and/or other type of machine-readable media/device for storing information. For example, the computer-readable medium may represent a hard disk, a read-only or writeable optical CD, etc. The display controller controls in a conventional manner a display, which may represent a cathode-ray tube (CRT) display, a liquid-crystal display (LCD), a plasma display, or other type of display device. The I/O controller controls I/O device(s), which may include one or more keyboards, mouse/trackball or other pointing devices, magnetic and/or optical disk drives, printers, scanners, digital cameras, microphones, etc.

In some embodiments, the present invention may be implemented entirely in executable computer program instructions that are stored on a computer-readable medium or may be implemented in a combination of software and hardware, or in certain embodiments, entirely in hardware.

Embodiments within the scope of the present invention include computer-readable media for carrying or having computer-executable instructions or data structures stored thereon. Such computer-readable media may be any available medium that is accessible by a general-purpose or special-purpose computer system. By way of example, and not limitation, such computer-readable media can comprise physical storage media such as RAM, ROM, EPROM, CD-ROM or other optical-disk storage, magnetic-disk storage or other magnetic-storage devices, or any other media which can be used to carry or store desired program code means in the form of computer-executable instructions, computer-readable instructions, or data structures, and which may be accessed by a general-purpose or special-purpose computer system.

When data processed by the present invention is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data which cause a general-purpose computer system or special-purpose computer system to perform a certain function or group of functions. The computer-executable or computer-readable instructions may be, for example, binaries, intermediate format instructions such as assembly language, or even source code.

In this description and in the following claims, a computer system may be defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a processor and memory) work together to perform operations on electronic data.

Those skilled in the art will appreciate that the invention may be practiced in network computing environments with many types of computer-system configurations, including hubs, routers, wireless access points (APs), wireless stations, personal computers, laptop computers, hand-held devices, multi-processor systems, microprocessor-based or programmable consumer electronics, network PCs, minicomputers, mainframe computers, mobile telephones, PDAs, pagers, and the like. The invention can also be practiced in distributed-system environments where local and remote computer systems, which are linked (either by hardwired, wireless, or a combination of hardwired and wireless connections) through a network, such as but not limited to the internet, both perform tasks. In a distributed-system environment, program modules may be located in both local and remote memory-storage devices.

FIG. 1 is a network schema 100 describing one example of a trivial implementation of the present invention. In this example, a 3xID subscriber 101 operates a computer system 102 upon which resides an email client connected to a 3xID engine (collective referenced as 103). This computer system 102 is operatively coupled to a 3xID server 106 (also called a 3xID.com server, if the 3xID server is associated with that particular domain name (e.g., 3xID.com or www.3xID.com) via an internet 105. The architecture details of the 3xID server 106 are described below. This 3xID server 106 is operatively coupled to a second computer system 107 via the internet 105. In some embodiments, the TCP/IP protocol stack model and associated protocols are used as a model upon which to connect the computer systems 102 and 107 with the 3xID server 106 via an internet 105. In some embodiments, the OSI model is used. Both the TCP/IP protocol stack model and the OSI model are well known in the art. (See Computer Networking: *A Top-Down Approach Featuring the Internet 2nd Edition*, James F. Kurose and Keith W. Ross, 2003.) In some embodiments, once these computer systems 102, 107 and 3xID server 106 are operatively connected and can exchange data via various protocols, then an embodiment of the present invention can be implemented. In some embodiments, as described above, an email 104 is generated and 3xID key inserted into the local portion of the email address by the email client operatively connected to a 3xID engine 103. As will be discussed more fully below, this 3xID key value can be automatically or manually generated. The email header 110 reflects the insertion of a key value into the local part of a sender address. In some embodiments, email 104 is sent via an internet 105 to the 3xID server 106 when the key value is recorded into a data base, and then sent via an internet 105 to a computer system 107. The recipient 109 is then free to open the email using an email client application residing on the second computer 107.

Figure 2:
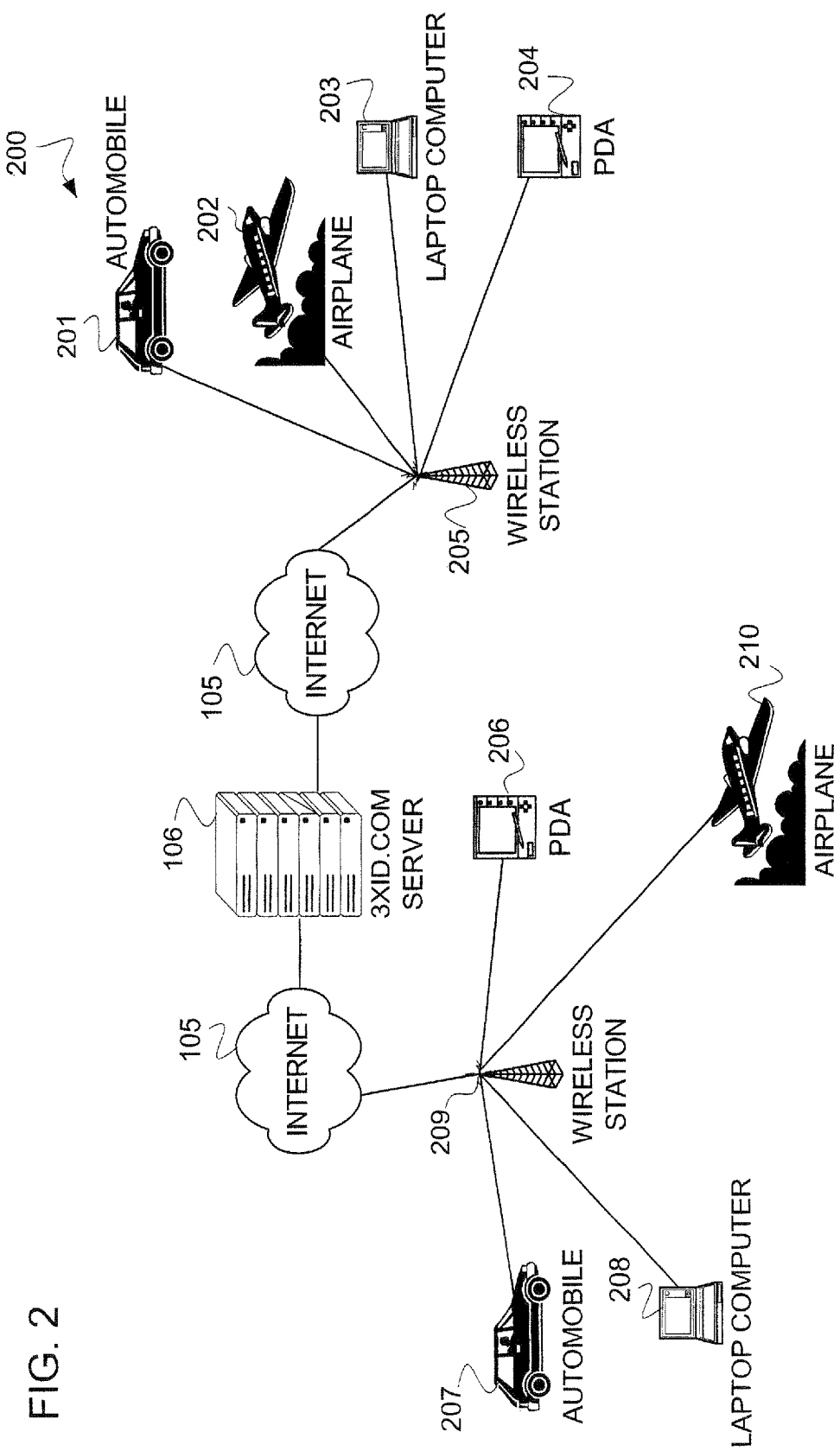
FIG. 2 is a block diagram of a network 200 that utilizes wireless technology.

In some embodiments, one example implementation of the present invention can allow means for the exchange of email 104 over a wireless network. Wireless networks, and the software and protocols used to implement such networks, are well known in the art. (See *Fundamentals of Wireless Communication*, David Tse and Pramod Viswanath, Cambridge University Press, 2005.) FIG. 2 describes a network 200 that utilizes wireless technology. In one embodiment, a user using a computer system residing in an automobile 201 or airplane 202 sends an email 104 using an email client connected to a 3xID engine 103 to send the email to a wireless station 205 that in turn is operatively connected to an internet 105. In some embodiments, a laptop computer 203 or PDA 204 is operatively connected to the wireless station 205 that, in turn, is connected to an internet 105, and enabled to send emails 104 using an email client connected to a 3xID engine 103. This internet 105 is, in turn, operatively connected to a 3xID server 106 that is connected to a wireless station 209. In some embodiments, the wireless station 209 is connected to one or more of the following: an automobile 207, laptop computer 208, airplane 210 or PDA 206. In some embodiments, the same wireless station (e.g., Nos. 205 or 209) is used to send and receive the same email 104. In some embodiments, automobiles 201 and/or 207 include a terrestrial-based vehicle, which may be a truck, motorcycle, hovercraft or other like vehicle. In some embodiments, airplanes 202 and/or 210 include a non-terrestrial-based vehicle, which may be a helicopter or other like vehicle.

Figure 3:
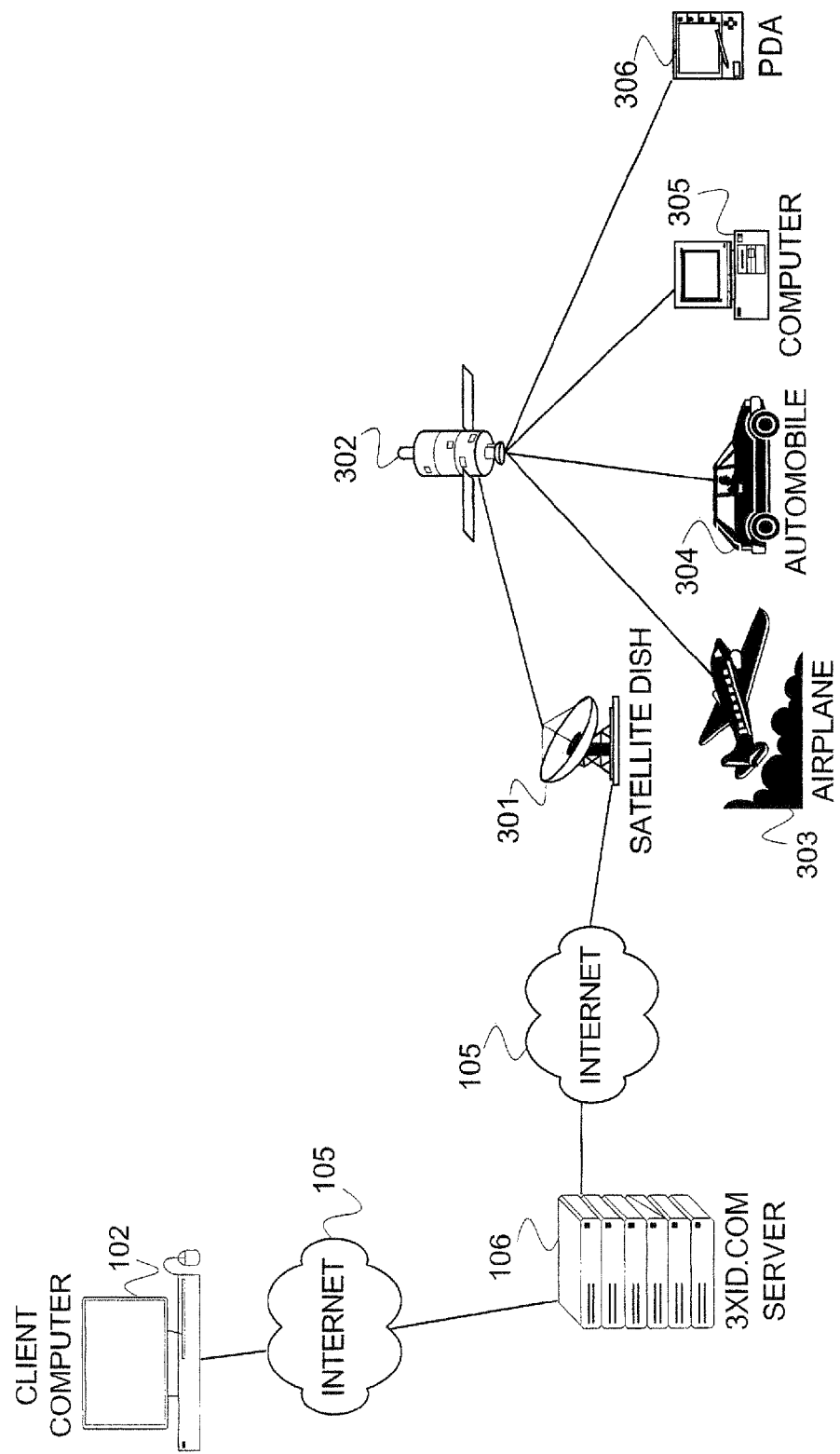
FIG. 3 is a block diagram of a network 300 that utilizes satellite technology.

In some embodiments, one example of the present invention can allow means for the exchange of email 104 over a satellite-based network. Satellite networks, and the software and protocols used to implement such networks, are well known in the art. (See *Satellite Communications Systems: Systems, Techniques and Technology*, 4th Edition, Gérard Maral and Michel Bousquet, John Wiley & Sons, 2002.) FIG. 3 describes a network 300 that utilizes satellite technology. In one embodiment of the present invention, a client computer system 102 is operatively coupled to a 3xID server 106 via an internet 105. This 3xID server 106 is, in turn, connected to an earth terminal 301 via an internet 105. The earth terminal 301 sends signals to a satellite 302. From this satellite 302, the signal is directed to any number of receivers based in an airplane 303, automobile 304, computer system 305, or PDA 306. Embedded in this signal is an email 104. In some embodiments, these receivers can also transmit signals back up to satellite 302, which, in turn, transmits the signals back to the earth terminal 301 and ultimately to the client computer system 102 via an internet 105. During the course of transmitting the signal back to the client computer system 102, the 3xID server 106 will, in some embodiments, check the validity of the sender based upon the 3xID key value supplied with the email. This checking process will be more fully discussed below.

Example System Use Cases

Figure 4:
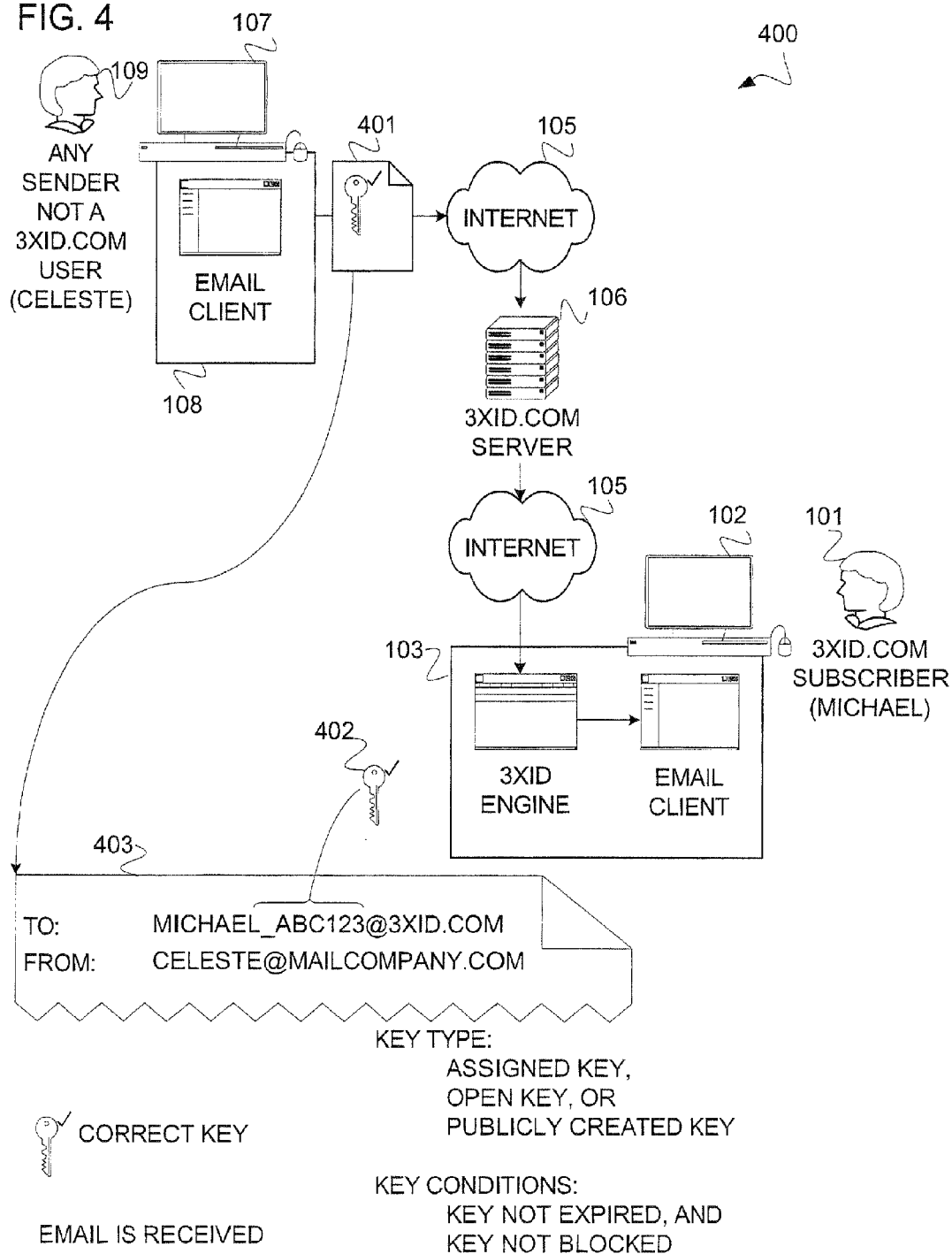
FIG. 4 is a schema 400 showing the successful sending of an email.

There are a number of use cases under which an email sent using the present system can be successfully sent, or received, by a subscriber to the system, or successfully rejected by the system for lack of a proper identifying 3xID key value. FIG. 4 depicts a schema 400 showing the successful sending of an email. In one embodiment, a sender who is not a user or subscriber to the 3xID system sends an email with a valid 3xID key value contained in the "To" address of the email. The email is routed through the internet 105 to the 3xID server 106, where the 3xID key value is parsed from the "To" address and evaluated to determine whether it is a valid 3xID key value. The process for parsing and evaluation is described below. As will be discussed later on, a valid 3xID key value can be in the form of an assigned key, open key or publicly created key. Additionally, certain conditions must be met, including the conditions that the key is not expired or the key is not blocked. In example FIG. 4, sender Celeste 109 is able to successfully send an email 401 to 3xID subscriber Michael 101 using 3xID key value 402. Email header 403 depicts the "To" and "From" fields of this email.

Figure 5:
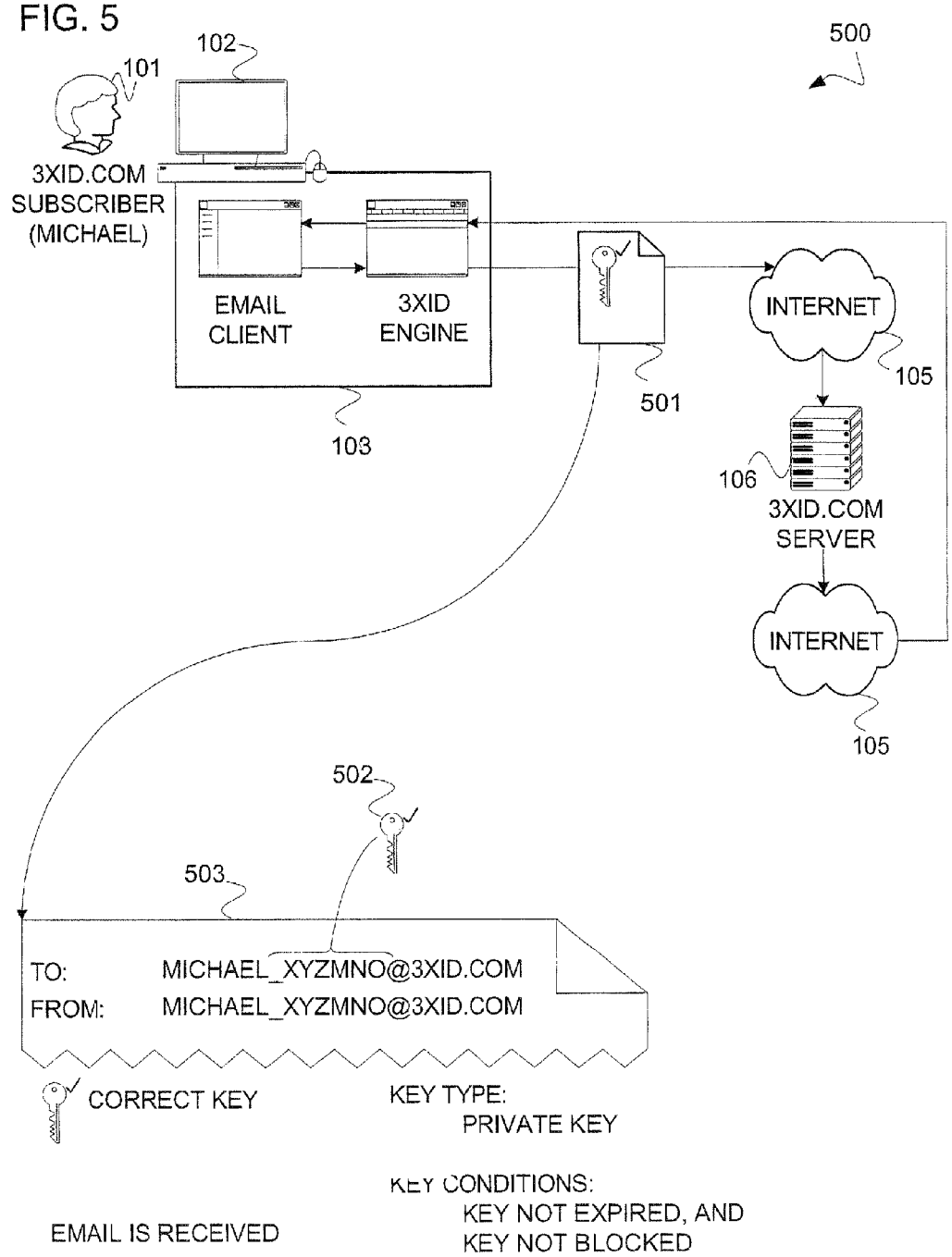
FIG. 5 is a schema 500 disclosing one way in which additional 3xID key values can be created and sent to a 3xID.com server to be recorded for future use.

FIG. 5 describes a schema 500 disclosing one way in which additional 3xID key values can be created and sent to a 3xID.com server to be recorded for future use. In this example, a 3xID key value 502 is sent in an email 501 to the 3xID server 106 via an internet 105. Once the 3xID key value 502 is parsed and recorded by the 3xID server 106, the email is sent the original sender, a 3xID subscriber Michael 101. An email header 503 with "To" and "From" fields is described showing the private key value inserted into both the "To" and "From" fields. In this example, the 3xID subscriber Michael 101 sends an email to himself As a condition for the private key value to be recorded it must not be a key value that is expired or blocked.

Figure 6:
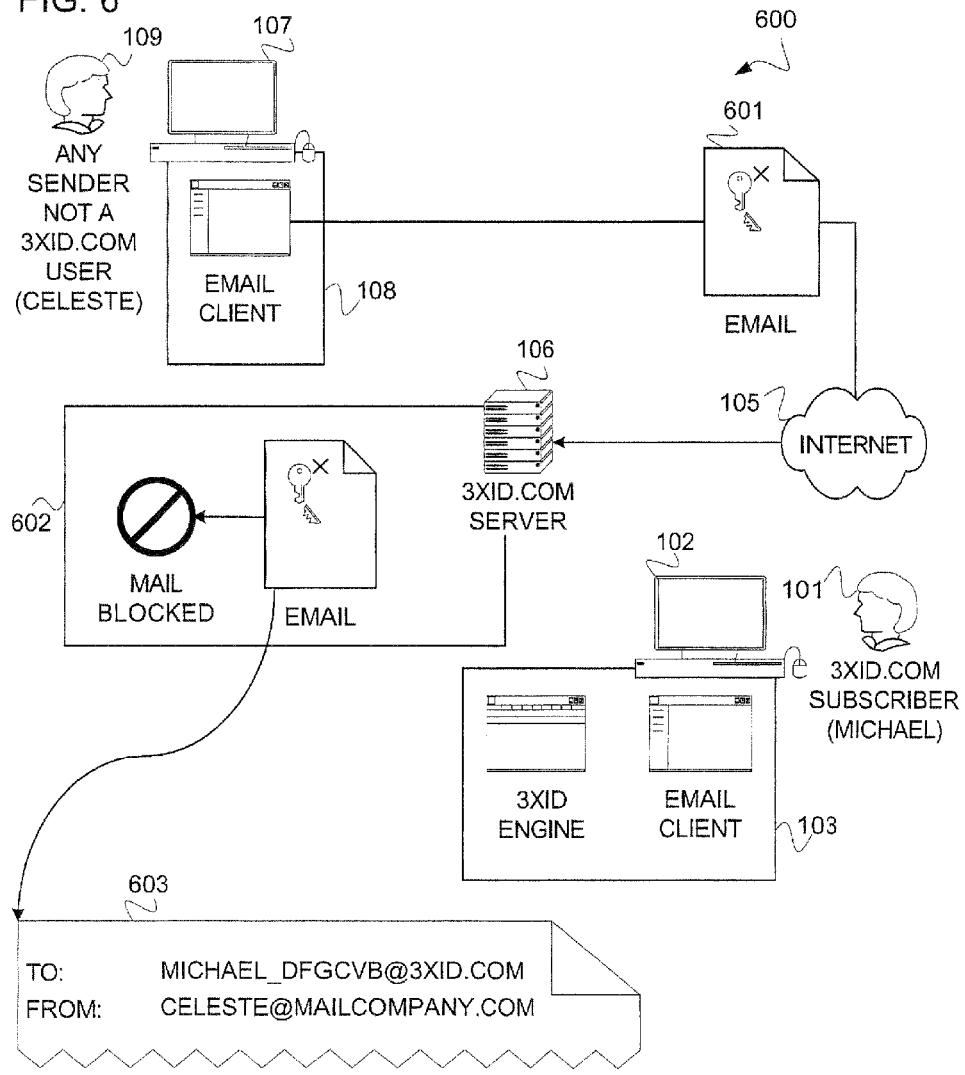
FIG. 6 describes a schema 600 of an unsuccessful attempt to email a 3xID subscriber, where the 3xID key value is invalid.

FIG. 6 describes a schema 600 of an unsuccessful attempt to email a 3xID subscriber, where the 3xID key value is invalid. In this example, sender Celeste 109 attempts to send an email 601 to 3xID subscriber Michael 101. This email 601 contains an invalid or incorrect 3xID key value. An algorithm 602 evaluates the key value to determine whether it is valid, and blocks the email where the 3xID key value is invalid. This algorithm 602 resides on the 3xID server 106, and is described in more detail below. The email header 603 depicts an invalid 3xID key value displayed in the "To" field.

Figure 7:
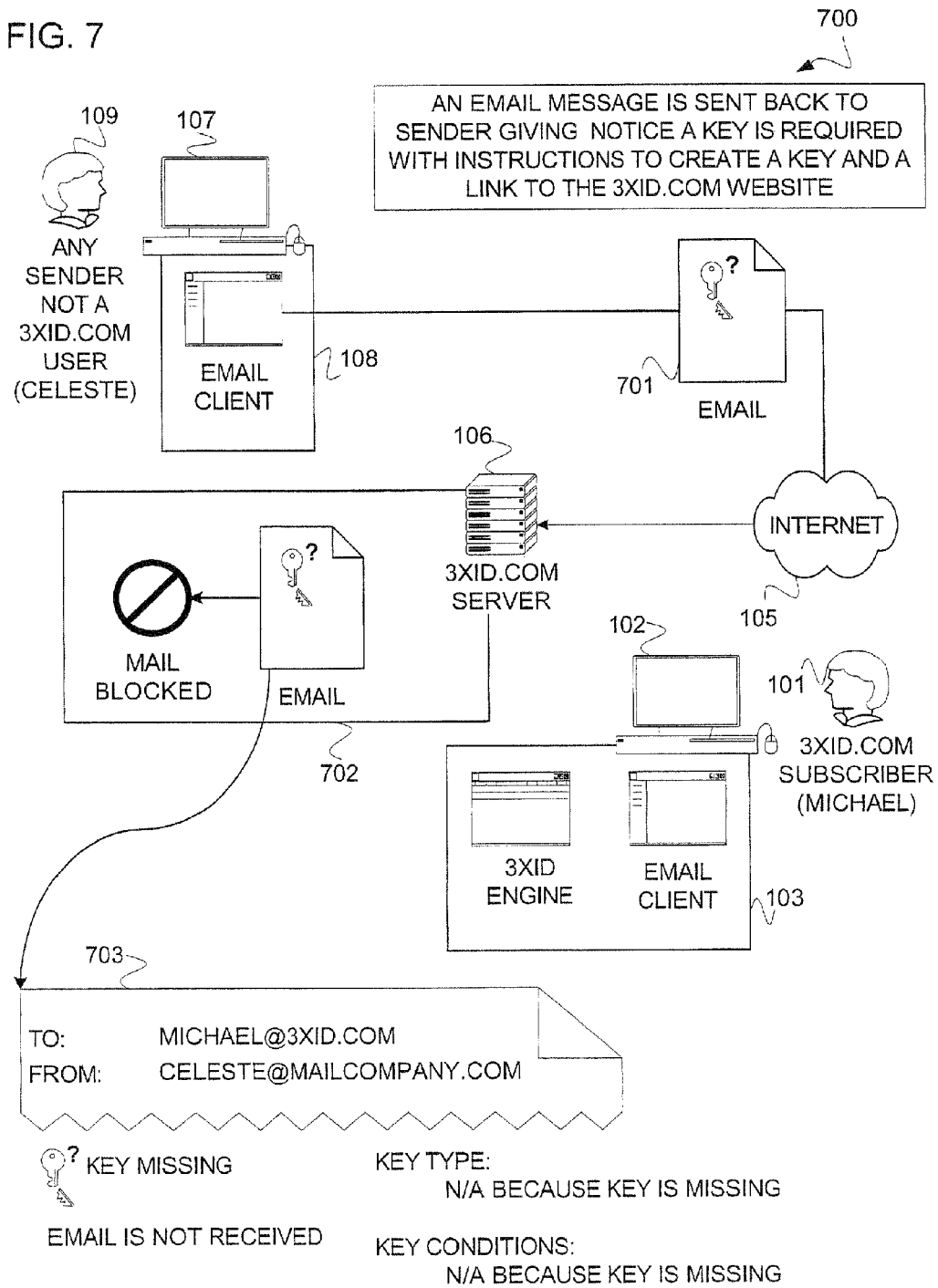
FIG. 7 is a schema 700 of an unsuccessful attempt to email a 3xID subscriber, where the 3xID key value is not inserted into the "To" field of the email header.

FIG. 7 is a schema 700 of an unsuccessful attempt to email a 3xID subscriber, where the 3xID key value is not inserted into the "To" field of the email header. In this example, sender Celeste 109 attempts to send an email 601 to 3xID subscriber Michael 101. As depicted in the schema 700, no 3xID key value is contained in the "To" field of the email header. Accordingly, email 701 is rejected for not having a key value. An algorithm 702 residing on the 3xID server 106 rejects this email 701. This algorithm 702 is more fully discussed below.

Figure 8:
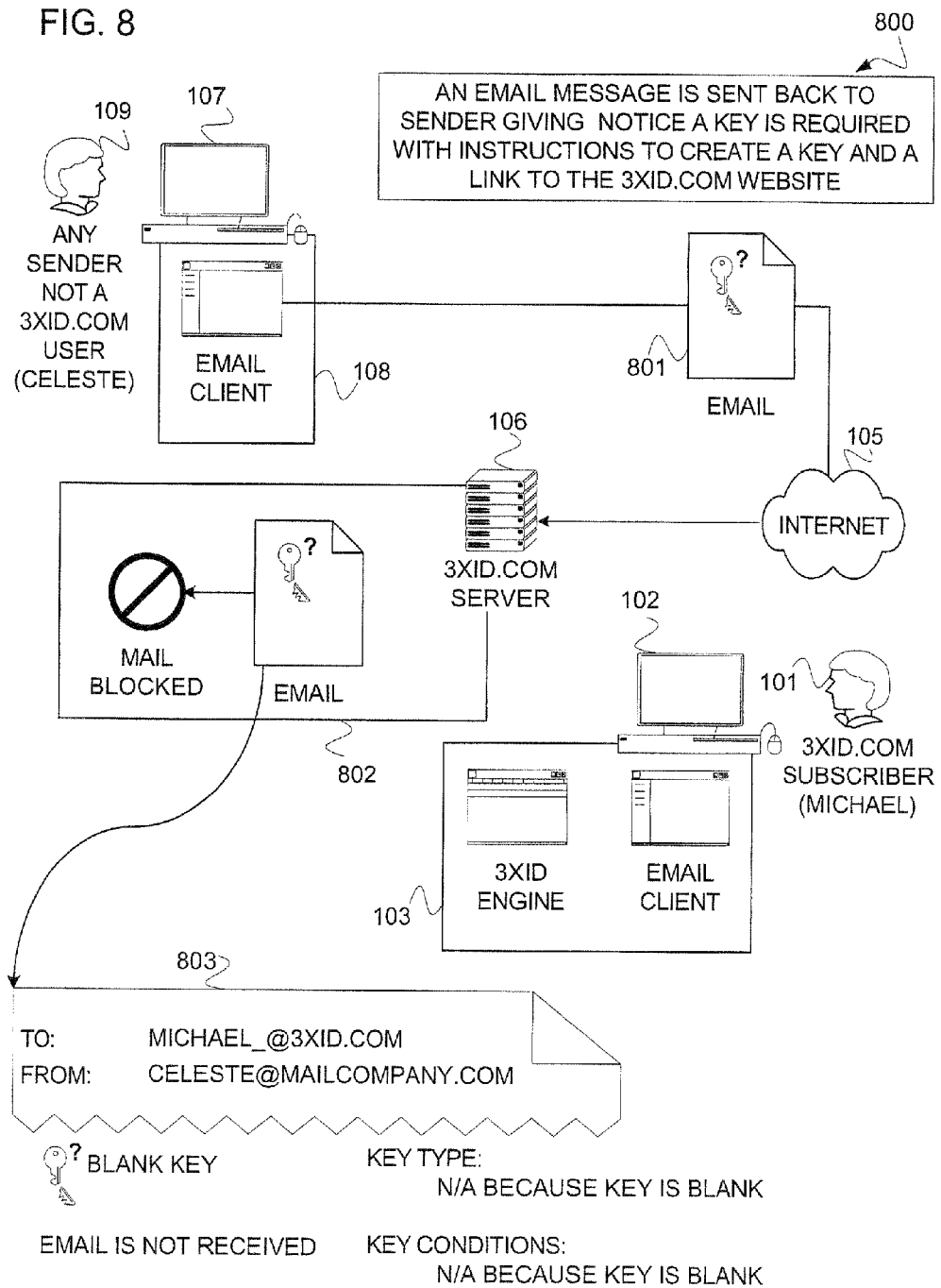
FIG. 8 is a schema 800 of an unsuccessful attempt to email a 3xID subscriber, where the 3xID key value is left blank and not inserted into the "To" field of the email header.

FIG. 8 is a schema 800 of an unsuccessful attempt to email a 3xID subscriber, where the 3xID key value is left blank and not inserted into the "To" field of the email header. In such an example, a delimiter is placed into the "To" field of an email 801 and its associated header 803, but no 3xID key value is inserted subsequent to this delimited 3xID key value. In some embodiments this delimiter is placed before the 3xID key value, while in other embodiments this delimiter is placed after the 3xID key value. In still other embodiments, a delimiter is placed both before and after the 3xID key value. A delimiter can be any ASCII, EBCDIC, or Unicode character. Further, in some embodiments, the delimiter may be a choice of characters that are all equally valid in terms of their numeric representation. This email 801 is then sent to the 3xID.com server for verification, where, in the present example, an algorithm 802 rejects the email 801 as having a blank key 3xID key value. This algorithm 802 is discussed below.

Figure 9:
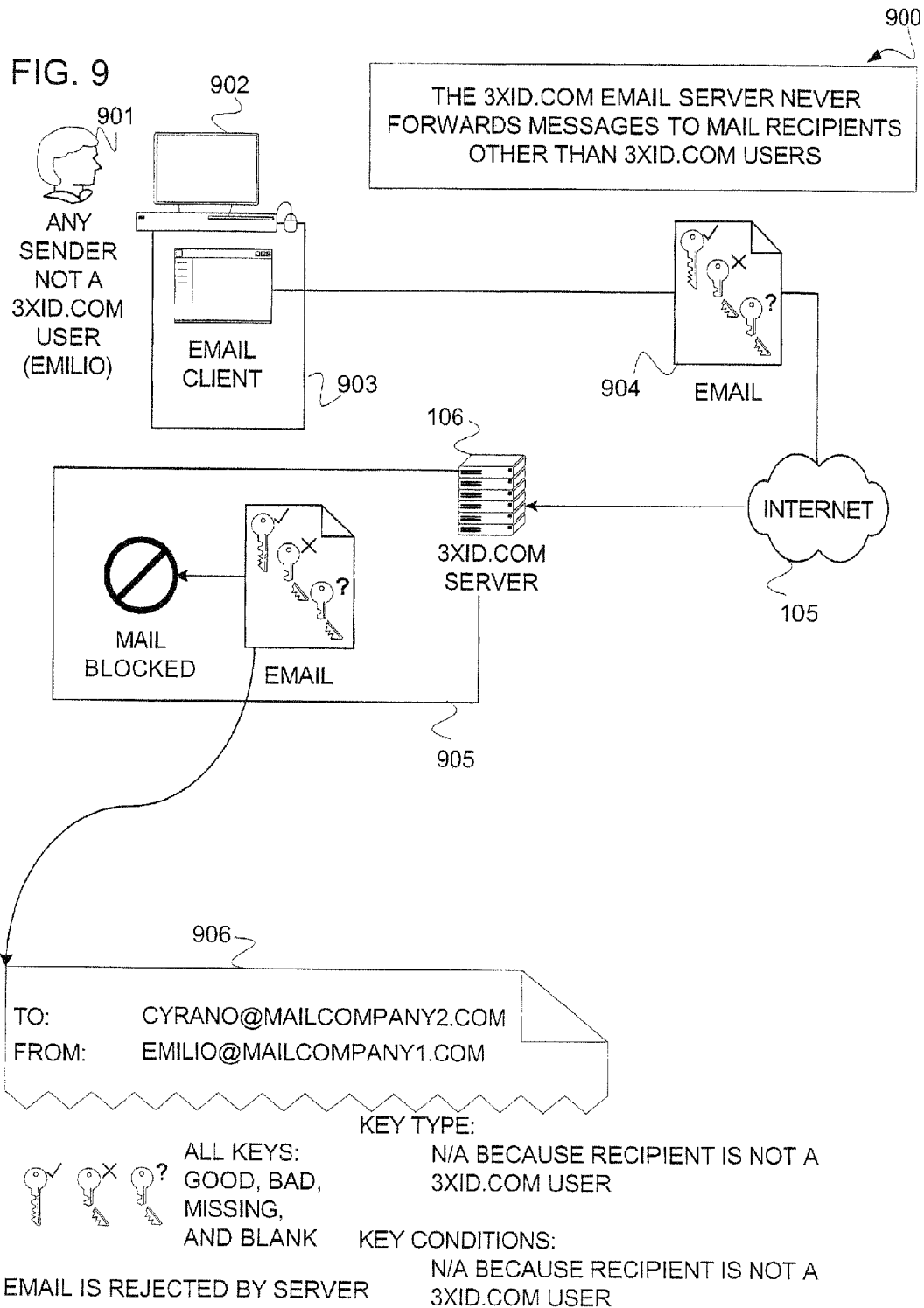
FIG. 9 is a schema 900 depicting an unsuccessful sending of email, where an email only addressed to a 3xID server 106 and subscriber may be processed by the system.

FIG. 9 is a schema 900 depicting an unsuccessful sending of email, where an email only addressed to a 3xID server 106 and subscriber may be processed by the system. In this example, a sender Emilio 901 attempts to send an email 904 via an email client 903 through an internet 105 to a 3xID server 106. Such an email 904 is blocked by an algorithm 905, because the header 906 does not contain a valid 3xID key value. This example illustrates the fact that only subscribers to the system may use the system to receive or filter incoming emails.

Figure 10:
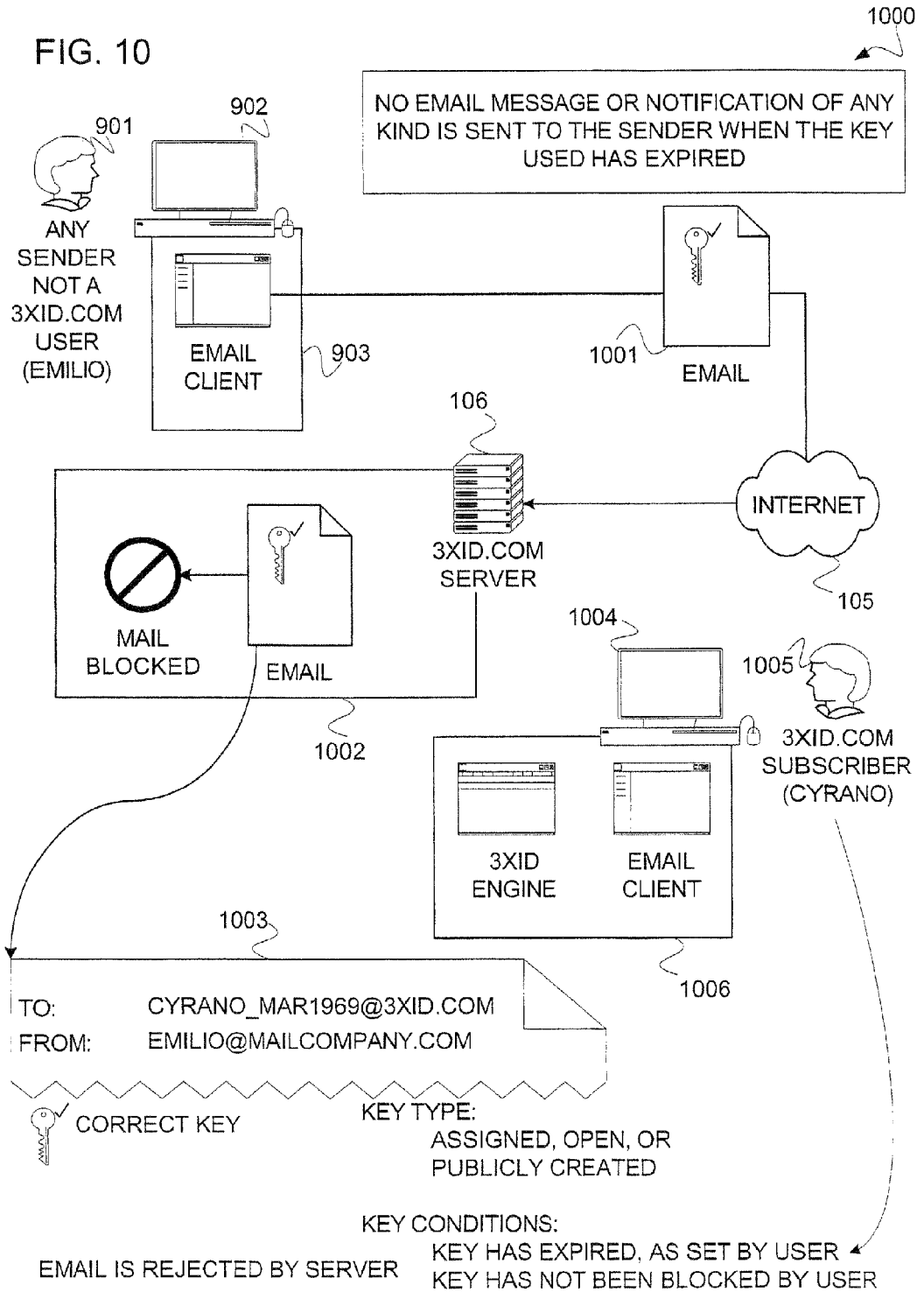
FIG. 10 is a schema 1000 depicting the unsuccessful sending of email, where the 3xID key value used in sending the email 1001 has expired.

FIG. 10 is a schema 1000 depicting the unsuccessful sending of email, where the 3xID key value used in sending the email 1001 has expired. Here subscriber Cyrano 1005 does not receive the email 1001 via his email client and 3xID engine 1006 residing on his computer system 1004. In this example, Cyrano 1005 does not receive the email 1001 on his computer system 1004 and the email client and 3xID engine 1006 residing thereon where the algorithm 1002 residing on 3xID server 106 determines that the 3xID key value has expired. This algorithm 1002 is described below. The email header 1003 depicts the "To" and "From" fields of the invalid email.

Figure 11:
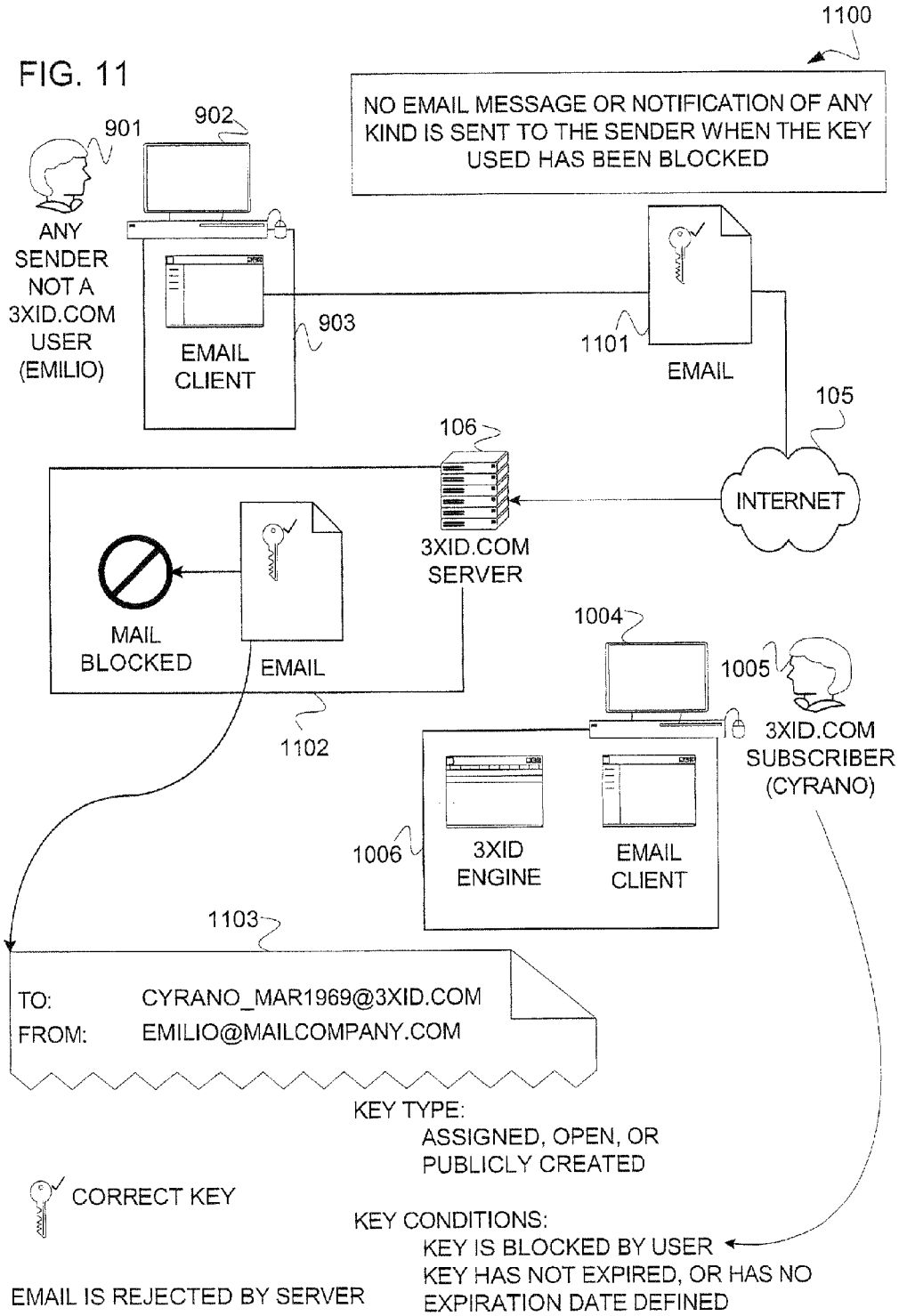
FIG. 11 is a schema 1100 depicting the unsuccessful sending of email, where the 3xID key value used in sending the email 1101 has been blocked.

FIG. 11 is a schema 1100 depicting the unsuccessful sending of email, where the 3xID key value used in sending the email 1101 has been blocked. Here an otherwise valid 3xID key value has been blocked by the 3xID subscriber Cyrano 1005. In such an example, the 3xID server 106 blocks the 3xID key value by using an algorithm 1102 residing on the 3xID.com server. This algorithm 1102 is described below. Email header 1103 describes the "To" ands "From" fields of the email 1101.

Figure 12:
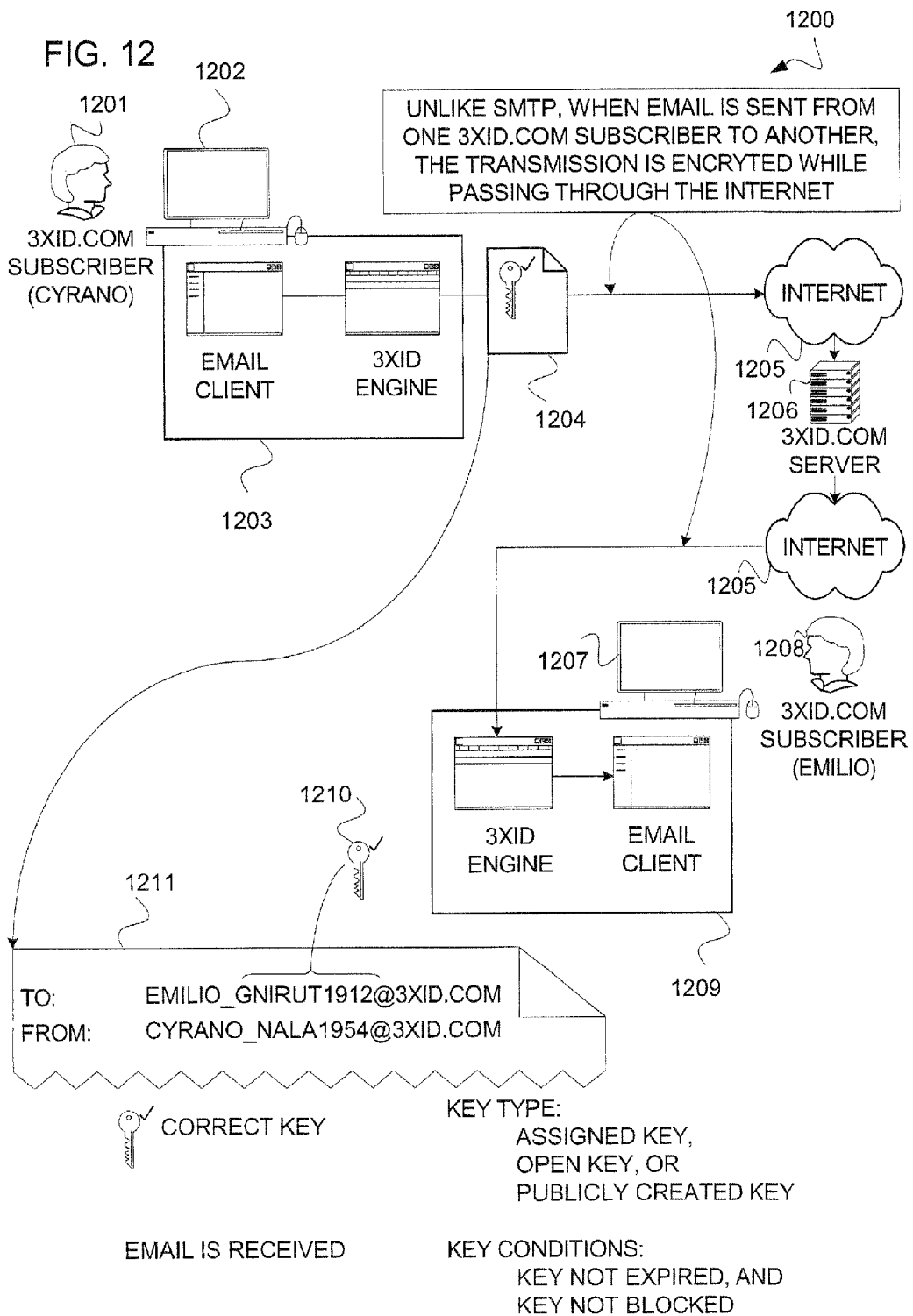
FIG. 12 is a schema 1200 describing the successful sending of an email between two 3xID subscribers.

In some embodiments, cases exist where emails are exchanged between two 3xID subscribers. FIG. 12 is a schema 1200 describing the successful sending of an email between two 3xID subscribers. In some embodiments where emails are exchanged between 3xID subscribers, the subscribers communicate via an encrypted protocol such as HTTPS. In one example, Cyrano 1201 sends an email 1204 via his computer system 1202 utilizing an email client connected to a 3xID engine (collectively referenced as 1203). The email 1204 is sent via, for example, HTTPS on an internet 1205 to a 3xID.com server 1206. Once received at the 3xID.com server 1206, the key value is verified (i.e., determined if the key is an Assigned Key, Open Key, or Publicly Created Key), conditions determined (i.e., is the key expired or blocked), and the email 1204 is sent via HTTPS on an internet 1205 to Emilio 1208, another 3xID subscriber. The header 1211 of email 1204 reflects the valid 3xID key value 1210. The email is received at Emilio's 1208 computer system 1207 running an email client connected to a 3xID engine (collectively referenced as 1209).

Figure 13:
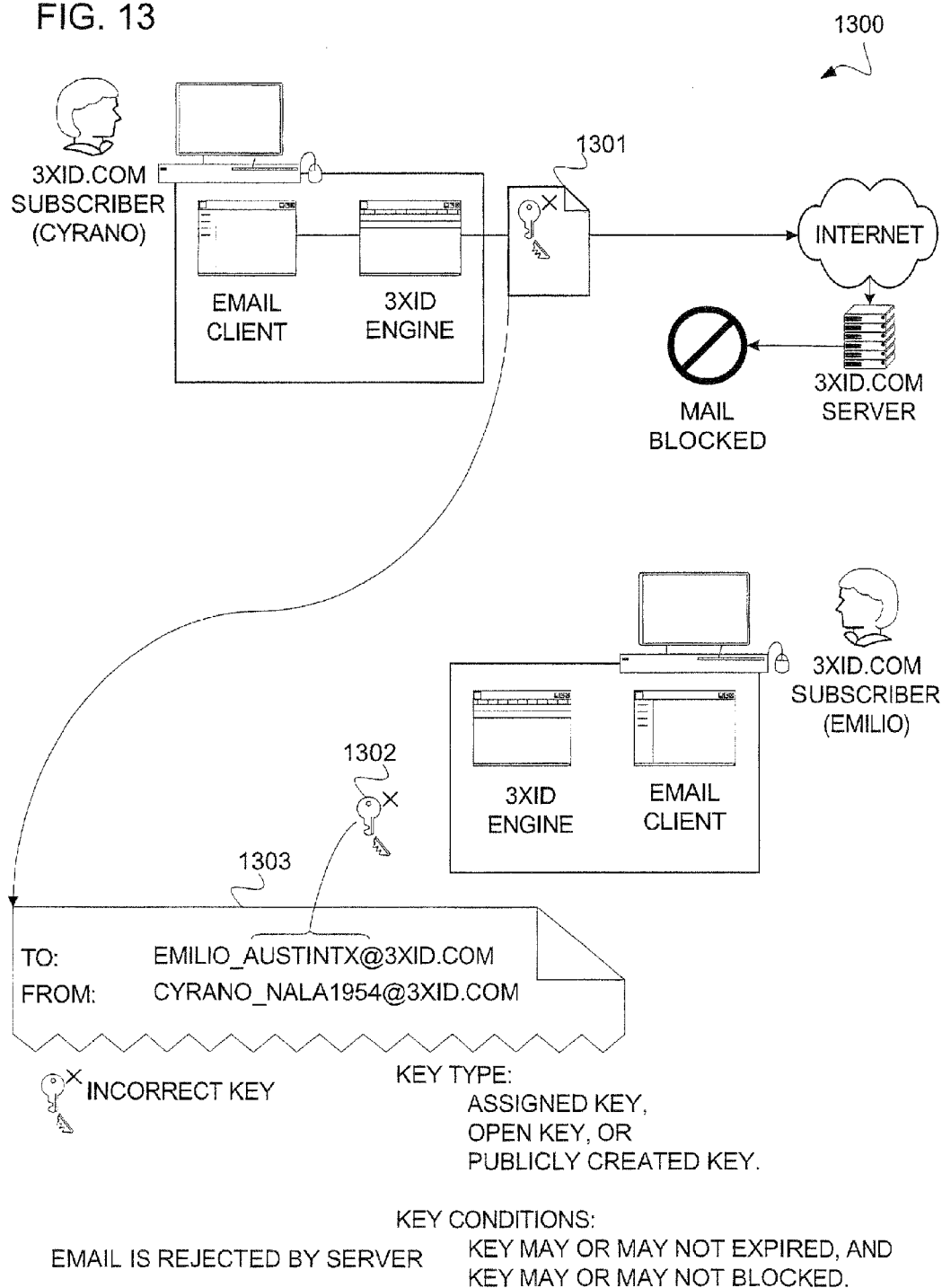
FIG. 13 is a schema 1300 describing the unsuccessful sending of an email between two 3xID subscribers (i.e., Nos. 1201 & 1208) where the 3xID key value is incorrect.

FIG. 13 is a schema 1300 describing the unsuccessful sending of an email between two 3xID subscribers (e.g., Nos. 1201 & 1208) where the 3xID key value is incorrect. In some embodiments, 3xID key value 1302 contained in the email header 1303 of the email 1301 is incorrect. The 3xID key value can be incorrect in that, for example, the 3xID key value is not an Assigned Key, Open Key or Public Key.

Figure 14:
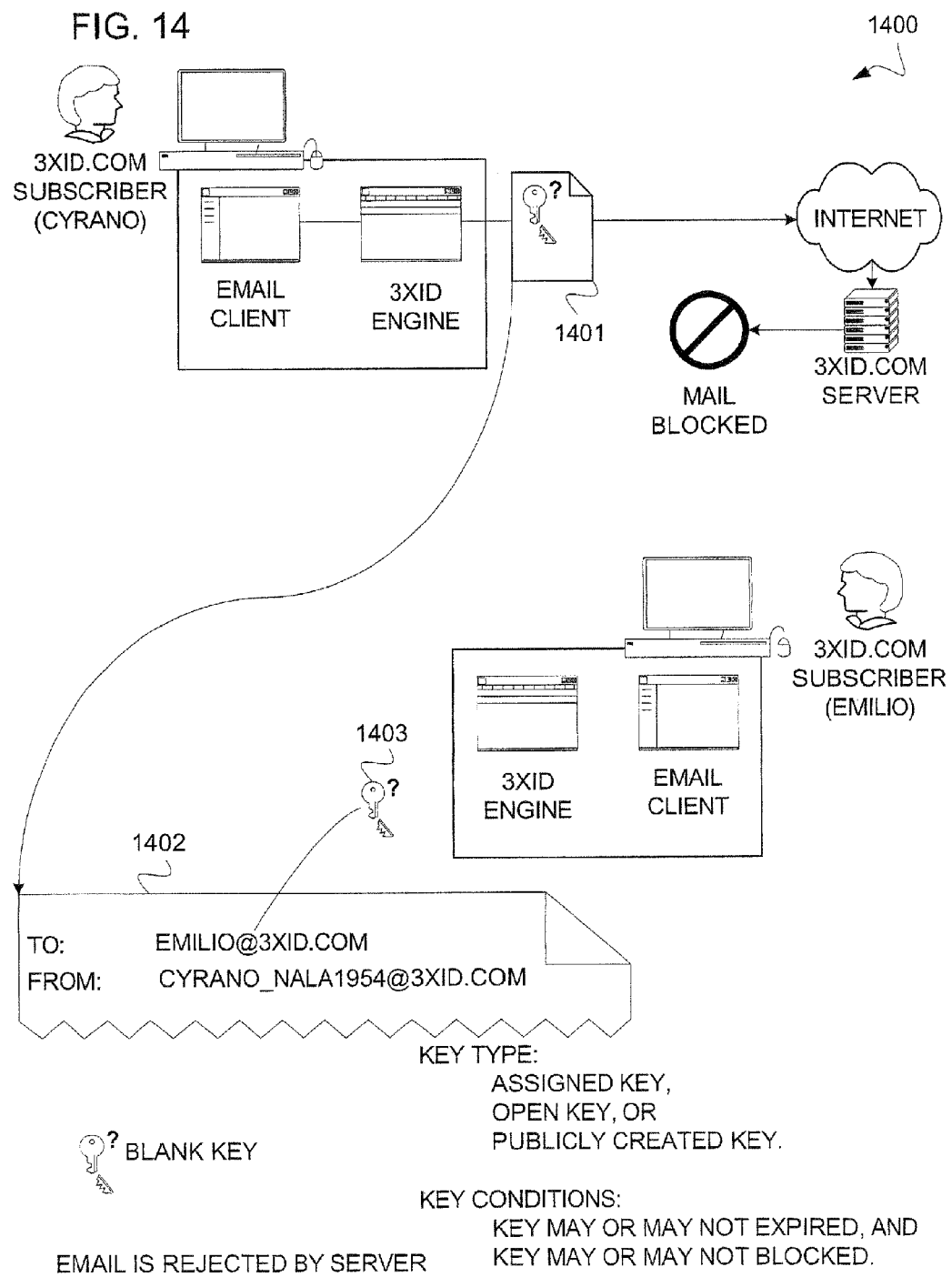
FIG. 14 is a schema 1400 describing the unsuccessful sending of an email between two 3xID subscribers (i.e., Nos. 1201 & 1208) where the 3xID key value is blank.

FIG. 14 is a schema 1400 describing the unsuccessful sending of an email between two 3xID subscribers (e.g., Nos. 1201 & 1208) where the 3xID key value is blank. In some embodiments, the 3xID key value 1403 is left blank in the email header 1402. Accordingly, the email 1401 is rejected in such a case.

Figure 15:
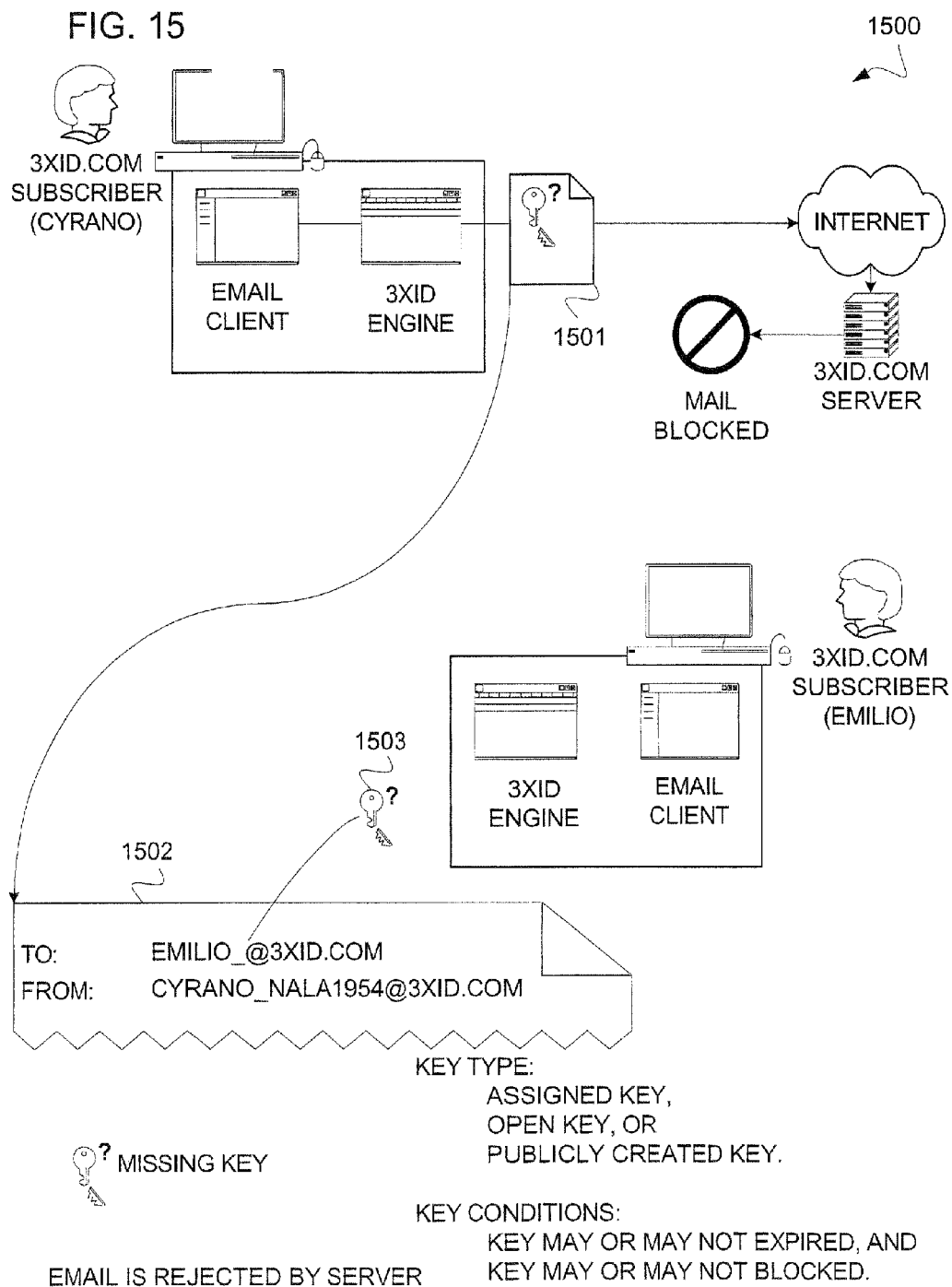
FIG. 15 is a schema 1500 describing the unsuccessful sending of an email between two 3xID subscribers (i.e., Nos. 1201 & 1208) where the 3xID key value is missing

FIG. 15 is a schema 1500 describing the unsuccessful sending of an email between two 3xID subscribers (e.g., Nos. 1201 & 1208) where the 3xID key value is missing. In some embodiments, the 3xID key value 1503 is missing such that, for example, the 3xID key delimiter is present in the "From" field of the email header 1502, but no 3xID key value actually exists. Thus, the email 1501 is rejected is such an example.

Figure 16:
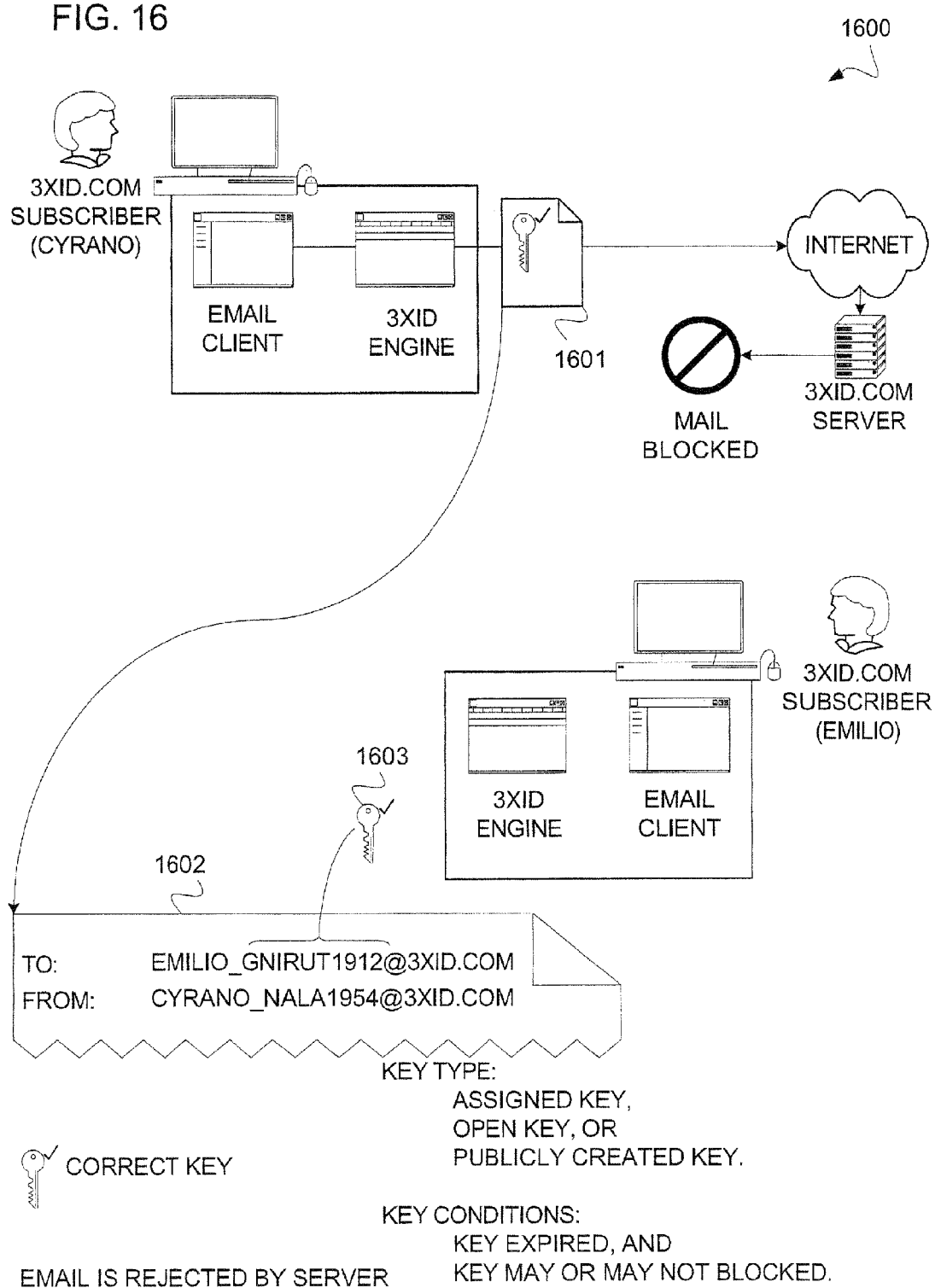
FIG. 16 is a schema 1600 describing the unsuccessful sending of an email between two 3xID subscribers (i.e., Nos. 1201 & 1208) where the 3xID key value is expired.

FIG. 16 is a schema 1600 describing the unsuccessful sending of an email between two 3xID subscribers (e.g., Nos. 1201 & 1208) where the 3xID key value is expired. In one example, a 3xID key value 1603 has expired such that an email 1601 is rejected by the 3xID.com server 1206. In such a case, the 3xID.com server 1206 reads the "From" field of the email header 1602, determines that the 3xID key value 1603 has expired, and rejects the email 1601.

Figure 17:
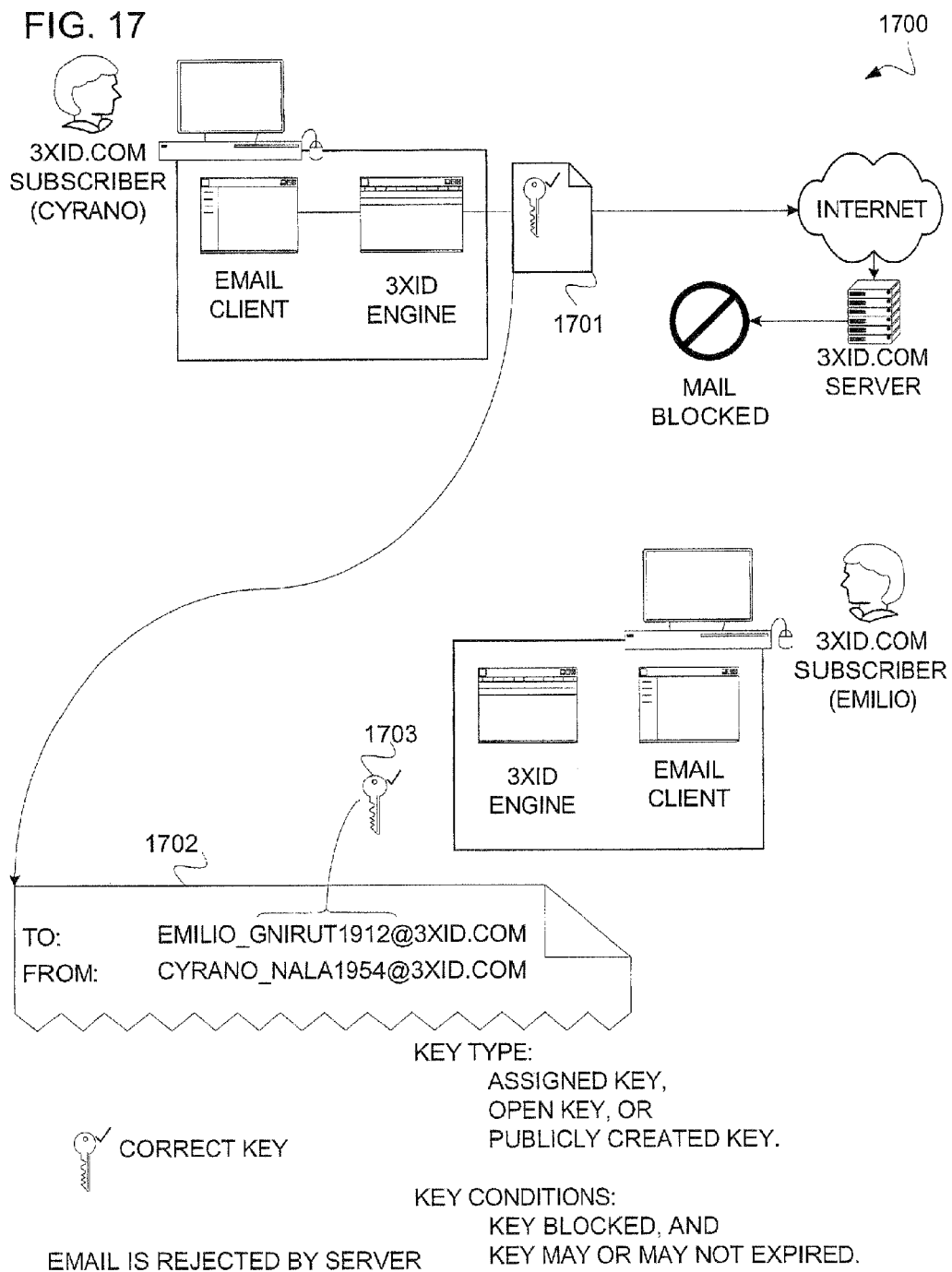
FIG. 17 is a schema 1700 describing the unsuccessful sending of an email between two 3xID subscribers (i.e., Nos. 1201 & 1208) where the 3xID key value is blocked.

FIG. 17 is a schema 1700 describing the unsuccessful sending of an email between two 3xID subscribers (e.g., Nos. 1201 & 1208) where the 3xID key value is blocked. In an example, email 1701 is blocked by 3xID.com server 1206, where the 3xID.com server 1206 reads the "From" field of the email header 1702 and determines that the 3xID key value 1703 has been designated for blocking. In such an example, the email 1701 containing the blocked 3xID key value 1701 is rejected.

A Three-Tier Architecture and Design

In some embodiments, the present invention can be thought of as a software application designed under a three-tier software architecture paradigm whereby various modules of computer code can be categorized as belonging to one, or more, of these three tiers. A three-tier software architecture is well known in the art. (See *Applying UML and Patterns: An Introduction to Object-Oriented Analysis and Design and the Unified Process* 2nd Edition, Craig Larman, Prentice Hall, 2002.) The first tier is an Interface level that is relatively free of application processing. The second tier is a Logic level that performs processing in the form of logical/mathematical manipulations (Logical Manipulations) of data inputted, in some embodiments, through the Interface level, and communicates the results of these manipulations with the Interface and/or backend or Storage Level. In some embodiments, these Logical Manipulations relate to certain business rules or tasks that govern the application as a whole. In some embodiments, these Logical Manipulations and associated business rules include, for example: the generating of a 3xID key upon the creation of an email message, the insertion of this 3xID key into the local part of the email address, and the comparing of the 3xID key with a key value stored in a database, just to name a few. The Storage level is a persistent, or, in some embodiments, a non-persistent storage medium. In some embodiments, one or more of these tiers is collapsed into another, resulting in a two-tier architecture, or a one-tier architecture. For example, the Interface and Logic levels may be consolidated, or the Logic and Storage levels may be consolidated, as in the case of an application with an embedded database. These tiers, in some embodiments, may be distributed amongst one or more computer systems such that, for example, a first computer may have a first tier (e.g., an Interface level), a second computer may have a second tier (e.g., a Logic level), and a third computer may have a third tier (e.g., a Storage level). This three-tier architecture, and the technologies through which it is implemented, in some embodiments, can be embodied in two or more computers organized in a server-client relationship, as is well known in the art. (See *Computer Networking: A Top-Down Approach Featuring the Internet* 2nd Edition, James F. Kurose and Keith W. Ross, Addison-Wesley, 2003.) This three-tier architecture may be implemented using one technology or, as will be discussed below, a variety of technologies. These technologies may include one or more object-oriented programming languages such as, for example, Java™, C++, Delphi™, C#™, or the like. Additional structured programming languages such as, for example, C may also be used. Moreover, scripting languages such as, for example, Perl, Python, PHP, JavaScript or VBScript™ may also be used.

An Interface Level

In some embodiments, an Interface level can be an application programming interface (API) or graphical user interface (GUI). APIs are interfaces that allow different software applications and/or code modules to interact and exchange data relating to, for example, email (see e.g., VIM, MAPI, and JavaMail). (See *Client/Server Survival Guide* 3rd Edition, Robert Orfali, Dan Harkey, and Jeri Edwards, Wiley, 1999.) GUIs can be in the form of a command-line interface common to, for example, the UNIX operating system, and the Pine, Elm or Mail email client applications. (See *Students Guide to Unix* 2nd Edition, Harley Hahn 1996.) In some embodiments, a GUI can be an email client displaying a form with certain input buttons, text boxes, and the like, generated using, for example, the C#™ or Visual Basic™ programming language. (See *Windows Forms Programming in C#* 1st Edition, Chris Sells, Addison-Wesley Professional, 2003.) In some embodiments, a Java™ based Applet and/or Servlet are used to provide a GUI and, in the case of, for example, Servlets, are used in conjunction with browser-related technology (see below) to provide dynamic content during the course of implementing an email client application. (See *Java How to Program* 3rd Edition, H. M. Deitel & P. J. Deitel, Prentice Hall, 1999.) In some embodiments, a GUI can be implemented by an email client using a hyper-text markup language (HTML) in combination with the hyper-text transfer protocol (HTTP) or the secured hyper-text transfer protocol (HTTPS) protocols to graphically display email and related information (i.e., web-based E-mail). (See *Computer Networking: A Top-Down Approach Featuring the Internet* 2nd Edition, James F. Kurose and Keith W. Ross, 2003.) In such an embodiment, the GUI is displayed by a browser application. Some well known browser-based applications include, for example, Netscape Browsers™, Internet Explorer™, Mozilla Firefox™, or Opera™, just to name a few. Common to these browser applications, is the ability to utilize HTTP or HTTPS to get, upload (i.e, PUT) or delete web pages and interpret these web pages which are written in HTML and/or an extensible-markup language (XML). HTTP and HTTPS are well known in the art, as are HTML and XML. (See id. *XML for the World Wide Web*, Elizabeth Castro, Peachpit Press, 2000; *Data on the Web: From Relations to Semistructured Data and XML* 1st Edition, Serge Abiteboul, Peter Buneman, & Dan Suciu, Morgan Kaufmann, 1999.) HTTP and HTTPS are, in some embodiments, used in conjunction with a TCP/IP protocol as described in the OSI model, or the TCP Protocol Stack model, both of which are well known in the art. (See *Computer Networking: A Top-Down Approach Featuring the Internet* 2nd Edition, James F. Kurose and Keith W. Ross, 2003.) The practical purpose of the client-based browser application is to enable a user to interact with the application through the display of plain text, command line, and/or interactive, dynamic functionality in the form of buttons, text boxes, scroll-down bars or other objects contained on one or more forms or web pages constructed using the aforementioned HTML and/or XML.

A Logic Level

In some embodiments, the above-described GUIs are stored on a client computer as an application, while in some embodiments the GUIs are stored as a Java Server Page (JSP™), or Active Server Page (ASP™) on one or more remote server computers connected to the client computer via an internet. These remote servers can, in some embodiments, be a web server and/or application server. In some embodiments, web servers running JSP™ can include the Apache™/Apache™ Tomcat web server. In some embodiments, web servers running ASP™ can include, for example, Microsoft Windows Web Server 2003™. In some embodiments, application servers running JSP™ can include an Orion Application Server, or J2EE™ Application Server or some other suitable server application. In some embodiments, application servers running ASP™ can include Windows Server 2003™.

In some embodiments, the Logic level controls when and how certain actions are undertaken. For example, if a user employing the 3xID system wants to send an email from their client application, they may execute a program that will automatically insert a 3xID key into the local part of an email. This Logic level will, in some embodiments, also control how the key is generated prior to insertion. In still other embodiments, a Logic level on a server application might parse out a 3xID key value from an incoming email, compare the parsed value against a database of key values to determine the validity of this value, and forward the email on to the email recipient where the key value is valid. In some embodiments, where, for example, web-based E-mail is implemented, a scripting language may control how and when certain web pages or pieces of content are provided to, or made accessible to a particular user. This scripting language can be in the form of, for example, Java™, Perl, Python or some other general-purpose scripting language.

A Storage Level

In some embodiments, the above-described Logic level interacts with a Storage level via, for example, an Open Database Connectivity (ODBC) API such as Java Database Connectivity (JDBC), Microsoft Data Access Components (MDAC), Independent Open DataBase Connectivity (iODBC) or some other suitable API. (See *ODBC 3.5 Developer's Guide*, Roger E. Sanders, McGraw-Hill Companies, 1998.) In some embodiments, a Storage level is implemented whereby tables of data are created, and data inserted into or selected from these tables using a Structured Query Language (SQL) or some other database-related language known in the art. (See *The Fundamentals of Database Systems* 3rd Edition, Remez Elmasri & Shamkant B. Navathe, Addison-Wesley, 2000.) These tables of data can be managed using a database application such as, for example, MySQL™, SQL Server™, or Oracle 9i™ or 10g™, just to name a few. These tables, in some embodiments, are organized into a relational-database schema (RDS) or object-relational-database schema (ORDS), as is known in the art. (See id.) In some embodiments, these schemas can be normalized using certain normalization algorithms so as to avoid abnormalities such as non-additive joins and other problems. In some embodiments, these normalization algorithms include Boyce-Codd Normal Form or some other normalization, optimization algorithm known in the art. (See id.) For example, in some embodiments, a table containing key values and associated email-recipient information are stored together in a database.

Component Object Model Design

In some embodiments, the various code modules that make up each of the above tiers are written and implemented using various component-oriented or object-oriented programming techniques, such as a Visual Component Library (VCL), Component Library for Cross Platform (CLX), Java Beans (JB), Java Enterprise Beans (EJB), Component Object Model (COM) or some other suitable technique. Typically these modules are linked to another program via various APIs and then compiled into one complete server and/or client application. The process for using modules in the building of client and server applications is well known in the art. (See *Component Based Software Engineering: Putting the Pieces Together*, George T. Heineman and William T. Council, Addison-Wesley, 2001; *Delphi Component Design*, Danny Thorpe, Addison-Wesley, 1996.)

3xID Client Architecture

In some embodiments, an email client is a computer program that is used to read and send e-mail. These email clients include, in some embodiments, Outlook™, Pegasus™, Mozilla Thunderbird™, Eudora™, or some other suitable email client application. In some embodiments, the Interface level for this email client can be any of the aforementioned APIs, GUIs, or a combination of the two. For example, in some embodiments, a GUI is provided by the email client application to a user to allow the user to send emails via the SMTP protocol or retrieve emails through the POP3 protocol. In some embodiments, a Multipurpose Internet Mail Extensions (MIME) protocol is used in combination with SMTP to send binary attachments. In some embodiments, this same email client application has various APIs such as, for example, MAPI, in some embodiments, that allows the email client to communicate with other code modules, such as a mail transfer application (MTA). These MTA can, in some embodiments, be located remotely on a server computer, or on the client computer.

In one embodiment, an email client and MTA are located on the same client computer system. In such an embodiment, the email client uses the MTA or 3xID engine as an intermediary in sending and retrieving of emails. In some embodiments, these email clients and MTAs reside on and are used in conjunction with an operating system such as Windows™, Linux™, Unix™, or some other suitable operating system. The upper portion of FIG. 1 describes the architecture (i.e., the 3xID Client Architecture) used in one such an embodiment. A variety of protocols are utilized in the sending and retrieving of emails. These protocols include the aforementioned SMTP and POP3, but also include IMAP, and other protocols that use TCP/IP, UDP/IP, or some other suitable packet-based or non-packet-based switching protocol. These various protocols and others are well known in the art. (See *Computer Networking: A Top-Down Approach Featuring the Internet 2nd Edition*, James F. Kurose and Keith W. Ross, 2003.)

Common to the use of, for example, TCP/IP is the use of data packets to transmit data across an internet. These data packets are typically composed of three distinct subparts—the IP datagram, the TCP segment, and the Load. The IP datagram is formatted such that it contains a number of distinct data fields, including fields relating to a source IP address, destination IP address, and a data or load field. Placed within this load field, in some embodiments, is a TCP Segment. This TCP Segment contains additional data fields, including fields relating to a source-port number and a destination-port number. As will be discussed more fully below, the information contained in the port fields will be used to direct data to, and identify specific applications residing on, remote computers connected via a network such as an internet. Additionally, a data field is included that contains the Load. Through a process known as tunneling the Load can contain almost any type of data, including another IP datagram (see e.g. IPV6), or, in some embodiments, data formatted (e.g., encoded) using XML. In some embodiments, this Load contains a Mail Transfer Protocol (MTP) written in XML. The following is a table describing the combination of the IP datagram, TCP segment, and Load carrying an XML-based MTP.

| MTP-IP DATAGRAM |
|---|
| TCP SEGMENT |
| LOAD: MTP |
| SOAP |
| XML |
| FORMATTED |
| DATA |

In some embodiments, the XML-based MTP is itself wrapped (e.g., encoded) in a Simple Object Access Protocol (SOAP) code that allows for remote procedure calls between a client computer system and the 3xID.com Server. In such an embodiment, the SOAP code calls certain procedures on the 3xID.com Server that then process the XML-based MTP. The use of SOAP for remote procedure calls is well known in the art. (See *XML Programming (Core Reference)*, R. Allen Wyke, Sultan Rehman, and Brad Leupen, Microsoft Press, 2002.) In some embodiments, a Common Object Request Broker Architecture (CORBA) or some other distributed programming protocol or architecture is used in lieu of SOAP to make remote procedure calls and/or engage in distributed programming. COBRA and other distributed programming protocols and architectures are well known in the art. (See *Client/Server Programming with Java and CORBA 2nd Edition*, Dan Harkey, and Robert Orfali, John Wiley & Sons, 1998; *Learning DCOM*, Thuan L. Thai, John Wiley & Sons, 1998.)

In some embodiments, rather than using XML wrapped in SOAP or some other protocol to allow for remote procedure calls, the 3xID.com Server is provided a DTD or XML schema that instructs the 3xID.com Server on how the XML contained in the Load will be organized. Once this instruction is provided, the 3xID.com Server will be able to process incoming XML contained in the Load. In some embodiments, a DTD or XML schema may or may not be used in conjunction with SOAP or some other protocol or architecture that allows for remote procedure calls. An actual example of the XML data contained in a Load organized base upon a schema could be in the form of the following:

```
<Data>
    <Emails>
        <TotalEmails>1</TotalEmails>
        <EmailItem="1">
            <To> <a>julian_xxxyyy@3xID.com</a>
                <a>hudson@mailcompany1.com</a>
                <a>diego@ mailcompany2.com</a></To>
            <Cc> <a>1@1.com</a>
                <a>2@2.com</a><a>3@3.com</a></Cc>
            <Bcc> <a>a@a.com</a>
                <a>b@b.com</a><a>c@c.com</a></Bcc>
            <Date>10/1/2006 10:30:00 AM</Date>
            <Subject>Hello</Subject>
            <Message>Test message. Thank you!</Message>
        </Email>
    </Emails>
</Data>
```

In some embodiments, when an email is sent using the 3xID Client Architecture a 3xID key may or may not be generated, depending on the circumstances. In some embodiments, subscribers can manually create and manage a list of keys for each person in their contact list. In some embodiments, 3xID keys are automatically created (see discussion below relating to alpha-numeric character-generator applications) at the initiation of the drafting of an email using an email client (i.e., the key is automatically generated and inserted into the local part of the email address). In some embodiments, the 3xID key value is automatically created and inserted into the local portion of an email address when the email passes form the mail client to the 3xID Engine. This key is communicated to the contact and is known as an "Assigned Key". Once generated and inserted, the 3xID key may, in some embodiments, by hashed or encrypted and sent on to a 3xID.com Server for verification and recording of the key value into a database. Once recorded, the email containing the hashed or encrypted 3xID key is sent to its ultimate recipient.

In one embodiment, special keys can be created that are called "Open Keys". An Open Key is created by the subscriber and remains available to the first person who sends an email with the key. Once an Open Key is used it is no longer an Open Key because it has been converted into an Assigned Key. That is, the key becomes associated with a particular subscribing sender's email address. Open Keys can by manually or automatically generated, and can be provided to a non-subscribing, or subscribing sender through merely, for example, verbally telling the sender the 3xID key value and having the sender place it into the local portion of the subscriber's email address prior to sending.

This 3xID key, in some embodiments, is generated randomly by an alpha-numeric character-generator application, and, in some embodiments, hashed, using a hashing function, or encrypted using symmetric encryption, asymmetric encryption, or a hybrid-crypto system. The 3xID key itself can be based upon ASCII, EBCDIC, or Unicode character sets and is typically composed of combinations of characters taken from these sets ranging in size from, for example, 8 to 256 bits. Alpha-numeric character-generator applications are well known in the art, and can be used to create a 3xID key of a predetermined length. In some embodiments, 3xID key values are created by incrementing a previously generated key value such that the 3xID key values are serial in nature. In some embodiments, the key length or key size is determined through empirical testing and/or modeling relating to what key size is most effective for determining the true identity of the sender of an email. In some embodiments, the key size might be $2^{128}$ bits, or some other key size known or accepted in the art.

In some embodiments, once generated some 3xID key values are time-stamped and have a use period upon the expiration of which they are no longer usable. The 3xID subscriber can, in some embodiments, determine, using a GUI, the period during which the key is valid, if any. In some embodiments, the 3xID key value has no expiration date, and hence is not time stamped. The decision to time-stamp the 3xID key value, or not, is based upon the needs of the 3xID subscriber. For example, a 3xID subscriber may for some reason only want a particular person to email them during a set time period. Where a time stamp is employed, the expiration value is passed to the 3xID.com server upon the first use of the time-stamped 3xID key value. In some embodiments, this time-stamp/expiration date is recorded into a data base residing on the 3xID.com server, and the key usable until the passing of the expiration date. This 3xID key value will be associated with a particular 3xID subscriber.

In some embodiments, limits are placed on the number of times a 3xID key may be used. Specifically, a 3xID subscriber may limit the number of times that a particular 3xID key may be used (i.e., set a use value). In some embodiments, the 3xID subscriber, using a GUI, may be able to set the number of times a particular 3xID key value may be processed by the 3xID.com server. This use value, in some embodiments, is set when a 3xID key value is first created by a 3xID subscriber. Once set, the use value is sent to the 3xID.com server on the first use of the 3xID key value. The use value is then recorded into a database residing on the 3xID.com server. In some embodiments, every time the 3xID key value is used, the use value contained on the 3xID.com server is decremented, and when the value reaches zero the 3xID key value becomes invalid.

In some embodiments, the string of characters generated by the alpha-numeric character-generator application is passed through a hashing function, wherein the numerical value of the string is changed. Some well known hashing functions include the Message-Digest algorithm 5 (MD5), and the Secure Hash Algorithm (SHA), just to name a few. (See *Computer Networking: A Top-Down Approach Featuring the Internet 2nd Edition*, James F. Kurose and Keith W. Ross, 2003.) In some embodiments, a hashing engine implementing one of the above-described algorithms is used by both the 3xID client application and the 3xID.com server to hash and unhash 3xID key values.

In some embodiments, the string of characters generated by the alpha-numeric character generator is passed through a symmetric-encryption algorithm such as the Data Encryption Standard (DES) or Advanced Encryption Standard (AES). (See id.) In some embodiments, the string of characters generated by the alpha-numeric character generator is passed through an asymmetric-encryption algorithm such as the Rivest, Shamir and Adleman (RSA) algorithm. (See id.) In such an embodiment, a private key value is used to encrypt the 3xID key, and a public key value is used to decrypt the encrypted 3xID key. In still further embodiments, a hybrid encryption scheme is employed wherein a 3xID key value is passed through a symmetric-encryption algorithm, and this symmetrically encrypted 3xID key is then passed through an asymmetric-encryption algorithm. Once this 3xID key encrypted using a hybrid-crypto system is received at its destination, the public asymmetric key is used to decrypt the symmetric key, and the symmetric key contained at the destination is used to decrypt the 3xID key into its original 3xID key value. In some embodiments, the encrypted key length or key size is determined through empirical testing and/or modeling relating to what key size is most effective for determining the true identity of the sender of an email. In some embodiments, the key size might be $2^{128}$ bits, or some other key size known or accepted in the art.

In such an embodiment, where asymmetric encryption is applied, the public key is sent to the 3xID.com server along with the encrypted 3xID key value and email message, and when received the public key is stored in a database that associates the public key with a particular 3xID subscriber, the database being accessible by the 3xID.com server. This public key is then subsequently used to decrypt 3xID key values encrypted with the corresponding private-key value. In some embodiments, an asymmetric-encryption engine resides on the 3xID client application to generate the public-key/private-key pair.

In some embodiments, where symmetric encryption is applied to encrypt the 3xID key value, a symmetric-encryption engine is compiled with both the 3xID.com server application and the 3xID client application. Once compiled, these encryption engines are capable of using a private-key value compiled with each respective application and encryption engine to encrypt or decrypt a 3xID key value. In another embodiment, a separate and unique symmetric private-key value is generated by the 3xID.com server, and its encryption engine, and provided to each 3xID subscriber. Once provided, these private-key values are maintained in a database residing on 3xID.com server, each private key being associated with a particular subscriber.

In some embodiments, where a hybrid-crypto system is employed, symmetric-encryption and asymmetric-encryption engines work together to first encrypt the 3xID key value with a symmetric private key, then re-encrypt with an asymmetric private key, such that there are two layers of encryption. Next the email containing the twice-encrypted 3xID key value and the public key of the asymmetric key pairing is sent to the 3xID.com server. At the 3xID.com server the public key is stored in a database, and then used to decrypt the first layer of encryption. Next, a private symmetric key value contained on the 3xID.com server is used to decrypt the second layer of encryption. Once the two layers of encryption are removed, in some embodiments, the 3xID key value can be verified. In still other embodiments, the key values themselves will serve as digital signatures such that no further verification of the 3xID key value is necessary.

In some embodiments, this hashed, or symmetric, asymmetric, or hybrid-crypto (collectively encrypted) generated key value is then inserted into the "To" or "From" fields of an email, separated in either case from the local name by an underscore, dash, or some other delimiter. In the case of hashed or encrypted 3xID key values, these key values would, in some embodiments, be unhashed or decrypted and verified by a 3xID.com Server wherein the key value is compared against a table of existing key values for a particular subscriber to the system. Once this key value is verified by a 3xID.com Server, the email containing the hashed or encrypted 3xID key would be forwarded on to its ultimate recipient. In some embodiments, where the unhashed or unencrypted email 3xID key value could not be verified, this value would be recorded into a database table containing keys for a particular subscriber to the system. In instances, for example, where a subscriber manually generated a 3xID key, the new manually created 3xID key would need to be recorded. In some embodiments, the 3xID key value is associated with a particular recipient, and can only be used by that recipient, whereas in other embodiments any non-subscribing sender can use a 3xID key so long as the key is valid for a particular subscriber. In some embodiments, a non-subscribing sender is never notified of the failure of the sender's email to reach the subscribing recipient, whereas in other embodiments the sender is notified of such a failure.

The following pseudo code depicts one example embodiment of the Logic level associated with the 3xID Client Architecture used for sending email:

```
// Perform data lookup using SQL query
   SELECT mail data
   FROM MailSent
   WHERE MailSent__MTP = FALSE;
// Lookup conditionals
IF data lookup does not return any rows, then stop.
Call MTP to resolve the following:
   The maximum number emails that can be packaged at a time.
   Call this maxCount. // initialize value
   The email block size (i.e., allocate a block size in memory).
   Call this blockSize. // initialize value
// Loop to parse data look up
FOR each email returned in the data lookup
```

-continued

```
Parse each to address.
Parse this to address into the following parts:
   person's name;
   mailbox;
   3xID key (sometimes present); and
   host identity.
// Perform data lookup to see if person has a key in the key table.
// Branch conditional regarding whether contact exists
   IF Contact exists, then:
      Do nothing
   ELSE
      Add contact
   END IF
   // Branch conditional to see if contact and key are associated
   IF key exists that is associated with above contact, then:
      Do nothing
   ELSE
      // Function calls to Generate new 3xID key value and
      // optionally hash, encrypt
      Add new key associated with contact by generating key
      value manually or automatically using Alpha-Numeric
      Generator and;
         Optionally Hashing; and/or
         Optionally Encrypting using one of the
         aforementioned encryption methods
   END IF
   // Branch conditional for whether key usage blocked
   IF key blocked, then:
      Mark as blocked
   // Branch conditional for whether key usage expired
   IF key expired, then:
      Mark expiration date
NEXT // end of loop
// Loop to look up start new email package
FOR each email returned in the data lookup STEP maxCount
   Start new mail package
   // Loop to package emails
   FOR 1 to maxCount or remaining emails, whichever is less.
      Place emails in package with an amount of email body data <=
      blocksize
   NEXT // end of loop
   // Function call to transmit the mail package using a socket and/or IP
   // and port address information
   Transmit to 3xID.com Server the mail package.
   Receive return response package.
   // Loop to update email sent package
   FOR each email in the response package
      // Function call to INSERT into table using SQL
      Update table with MailSent__MTP = True
      Update table with MailSent__server__ID
   NEXT // end of loop
   // Loop to break email into size that can be sent
   FOR each email in the response package
      IF body of email was > blockSize
         // Loop to actually apply MTP and send the email
         FOR each remaing block to completion
            // Function call for MTP sendblock
            Call MTP sendblock
         NEXT // end of loop
      END IF
   NEXT // end of loop
   Start new email complete package
   // Loop
   FOR each email in the response package
      // Function call to add email to package
      Add email to complete package
   NEXT // end of loop
   // Function call to make a remote call to 3xID.com server
   Call MTP function to tell the 3xID.com server that email(s) are
   complete by specifying them in the complete package
   // Loop
   FOR each email in the response package
      // Function call to INSERT into table using SQL
      Update email in table so that MailSent__MTP = TRUE
   NEXT // end of loop
NEXT // end of loop
// Function call to ensure that all key values ordered and unique
Synchronize keys.
```

The above-described optional hashing and/or encrypting of the manually or automatically generated 3xID key values is carried out using a hashing or encryption module or component applying one of the above-described hashing or encryption algorithms, as is known in the art.

In some embodiments, the above code could be written in a manner to reflect the efficiencies desired by a particular developer. For example, in some embodiments, loops (i.e., iterative operations), as are commonly known in the art, may be replaced with recursive function calls. In still other embodiments, the style of loops, or termination conditions for the loops, or trivial cases for the recursive function calls, may vary based upon the needs of the particular developer implementing this algorithm. The use of recursion in lieu of iterative operations is well known in the art. (See *Algorithms in C++ Parts: 1-4, 3rd Edition*, Robert Sedgewick, Addison-Wesley, 1998.)

In some embodiments, emails that are sent that are shorter than a predetermined block size are enclosed in the body of the message within the message node. In some embodiments, emails that contain a larger body should be sent using a blocking method (i.e., a method relating to the aggregation of email data). In some embodiments, whenever information is provided in the message node, the client computer system will assume the message is complete and reject any subsequent attempts to send blocks. In some embodiments, there is a limit to the total number of emails that may be packaged in one call. In some embodiments, this limit can be resolved by calling a system-parameters web service function.

In some embodiments, when mail is sent to the 3xID.com server that is very large a blocking mechanism (i.e., a mechanism relating to the aggregation of email data) can be used to send the full email contents. In some embodiments, this will allow email that is larger than the amount of information memory can reasonably hold to be sent. In some embodiments, blocks must be sent in order. In some embodiments, the block size can be resolved by calling the system-parameters web service function. In some embodiments, each block that is sent, except the last block, must be the current block size. In some embodiments, blocks that are shorter will be rejected. In some embodiments, when the final block is sent, whether it is short or not, the short-block flag should be set to true. In some embodiments, blocks sent after this will be rejected.

In addition to the Logic level governing the sending of an email, this Logic level also governs the retrieving of email from the 3xID.com server. In some embodiments, the client computer system polls the 3xID.com Server via an internet based upon a predetermined time period. In one embodiment, this polling takes place every 15 minutes. As described above, in some embodiments, this polling takes place using POP3 or IMAP. The following pseudo code depicts one example embodiment of the Logic level associated with the 3xID Client Architecture used for requesting and receiving (i.e., getting) email:

```
// Resolve user ID and password and validate. Resolve globally unique local client ID. If
// client does not have a local client ID, request one using MTP.
IF the client does not have a local client ID, then request one using MTP.
Unpackage email package.
// Loop to parse out the email header
FOR each email in package
    Parse the "From" address.
    Parse the "To" address that corresponds to the user receiving the email.
    Parse this "To" address into the following parts:
        mailbox;
        sender Key.
    // Assume that the server allowed the mail because it was meant to go through and
    // the sender's key should be stored in the database.
    // Perform 3xID key value data lookup using SQL query:
        SELECT 3xID key value
        FROM Contacts
        WHERE Contacts_email_address = fromAddress;
    // Branch conditional for adding contacts
    IF data lookup does not return any rows, then add a new row to Contacts with the
    email address and contact name if known.
        Next resolve the new Contacts_ID.
    ELSE
        resolve the Contacts_ID
        // Using SQL query perform look up
        Perform data lookup:
            SELECT data
            FROM Keys
            WHERE
            Keys_Contacts_ID = contact_ID
            AND
            Keys_key = senderKey;
    END IF
    // Branch conditional for adding keys
    IF data lookup does not return any rows then add a new row to Keys with the
    contact_ID and Keys_key=senderKey.
        Mark Keys_blocked as false, leave Keys_expiration_date null, and mark
        Keys_open as false.
    END IF
    // Function call to INSERT one or more records using SQL
    Place a new record in the MailReceived table and populate all known values.
    MailReceived_POP3 should be marked false.
    // Function call to make a request of the MTP
    Send a request to the MTP to see if more blocks exist for the email.
```

```
        // Branch conditional to determine how to process additional blocks
        IF there are more blocks available, then:
            FOR until the end of the block:
                request blocks one by one and append to the body of the email.
            NEXT // end of loop
        NEXT // end of loop
    // Branch conditional to determine what to do after all emails are processed
    IF all email are processed, then send a MTP package that they have been successfully received.
    // Function call to ensure that all key values ordered and unique
    Synchronize keys.
```

In some embodiments, the above code could be written in a manner to reflect the efficiencies desired by a particular developer. For example, in some embodiments, loops (i.e., iterative operations), as are commonly known in the art, may be replaced with recursive function calls. In still other embodiments, the style of loops, or termination conditions for the loops, or trivial cases for the recursive function calls, may vary based upon the needs of the particular developer implementing this algorithm. The use of recursion in lieu of iterative operations is well known in the art. (See *Algorithms in C++ Parts: 1-4, 3rd Edition*, Robert Sedgewick, Addison-Wesley, 1998.)

In some embodiments, when email is requested from the 3xID.com server, the header is returned along with the beginning of the message. In some embodiments, in cases where the message may be very large, for example where a 100-mega-byte file is attached, a mechanism of sending the message in blocks is utilized. Messages that are sent complete with, for example, a get-mail function will have a zero in the <blocks> XML tag, while message that need to be sent using blocks will have the total number of blocks in the <blocks> XML tag. In some embodiments, each block must be requested one by one from the 3xID.com server using a separate function call, and the contents of the block appended to the body of the message. In some embodiments, this will prevent the 3xID.com server and client computer system from having to instantiate a string variable the size of 100 megabytes. The size of the block may change over time as necessary to adjust packet traffic on the internet system, therefore, in some embodiments, prior to receiving packets it would be helpful for the client service to refer to the block size in the system-information function call.

In some embodiments, when email is requested from the 3xID.com server a very large blocking procedure (i.e., a procedure relating to the aggregation of email data) can be used to retrieve the full email contents. In some embodiments, this will allow email that is larger than the amount of information memory can reasonably hold to be retrieved. Such blocks can be requested in any order. In some embodiments, the block size can be resolved or determined by calling a system-parameters web service function.

In some embodiments, a database application (i.e., a Storage level) is used to manage data including, for example, the various 3xID key values, received emails, sent emails, deleted received and stored emails, and to store contact information. In some embodiments, this database application is a native database application that resides with the 3xID Engine. In some embodiments, this database application is a part of the email client such that the email client manages this data. In some embodiments, the decision to store this data separately or together within one database table will be based upon certain considerations associated with database normalization.

In some embodiments, the following database tables are implemented at a Storage level using the below-described data types:

| GlobalSettings | |
| --- | --- |
| ID | integer |
| Auto_Login_Enabled | boolean |
| Auto_Login_Username | varchar |
| Pop3_port | integer |
| Smtp_port | integer |
| Pass_Email_Immediately | boolean |
| Time_Wait_Send_Receive | integer |
| System_Icon_Enabled | boolean |
| Stealth_Mode_Enabled | boolean |

The GlobalSettings Table is used to store and manipulate data relating to the 3xID client's data and settings. The tables listed below (e.g., UserSettings, Contacts) are tables containing data relating to the specific 3xID subscriber.

| UserSettings | |
| --- | --- |
| UserSettings_ID | integer |
| UserSettings_AutoLoginPassword | varchar |
| Contacts | |
| Contacts_ID | integer |
| Contacts_email_address | varchar |
| Contacts_Name | varchar |
| Keys | |
| Keys_ID | integer |
| Keys_Server_ID | integer |
| Keys_Contacts_ID | integer |
| Keys_KeyValue | varchar |
| Keys_Blocked | boolean |
| Keys_Expiration_date | datetime |
| Keys_Open | boolean |
| Keys_Creation_date | datetime |
| Keys_Sender_created | boolean |
| MailReceived | |
| MailReceived_ID | integer |
| MailReceived_Pop3 | boolean |
| MailReceived_Server_Unique_Key | integer |
| MailReceived_Keys_ID | integer |
| MailReceived_Date | datetime |
| MailReceived_To | varchar |
| MailReceived_From | varchar |
| MailReceived_CC | varchar |
| MailReceived_BCC | varchar |
| MailReceived_Subject | varchar |
| MailReceived_Body | varchar |
| MailSent | |
| MailSent_ID | integer |
| MailSent_MTP | boolean |

-continued

| | |
|---|---|
| MailSent_Server_Unique_Key | integer |
| MailSent_Keys_ID | integer |
| MailSent_Date | datetime |
| MailSent_To | varchar |
| MailSent_From | varchar |
| MailSent_CC | varchar |
| MailSent_BCC | varchar |
| MailSent_Subject | varchar |

In some embodiments, other data types may be used, such as: BLOB, CLOB, strings, doubles, floats or other suitable data types known in the art may be used. (See *The Fundamentals of Database Systems* 3rd Edition, Remez Elmasri & Shamkant B. Navathe, Addison-Wesley, 2000.) In some embodiments, the data type is a user-defined data type.

3xID.COM Server Architecture

In some embodiments, an enterprise platform is implemented upon which sits the 3xID.com server application. Enterprise platforms are well known in the art and can include: J2EE™, Orion™, .NET™ or .ASP™, just name a few. (See *Designing Enterprise Applications with the Java™ 2 Platform (Enterprise Edition)* $1^{st}$ Edition, Nicholas Kassem, Addison-Wesley Professional, 2000.) In some embodiments, these Enterprise platforms allow for applications residing on them to utilize certain services, via various APIs, such as web services and the functionality associated with these services. For example, in some embodiments, an application, such as a 3xID.com Server engine residing on an Enterprise server, can make SQL calls to a database accessible by the Enterprise server. And again, in some embodiments, a 3xID.com Server engine residing on an Enterprise server can make function calls to establish a TCP/IP or, for example, a UDP/IP connection. As is discussed elsewhere, once a TCP/IP connection is initiated additional protocols such as HTTP, HTTPS, SMTP, POP3 or IMAP may be used. (See *Computer Networking: A Top-Down Approach Featuring the Internet* 2nd Edition, James F. Kurose and Keith W. Ross, 2003.) The right-hand third of FIG. 18 captioned "3XID.COM SERVER" describes the architecture (i.e., the 3xID.com server Architecture) used in one such an embodiment. In some embodiments, as alluded to above, a 3xID.com Server engine communicates with an enterprise server application at an Interface level via an API. This 3xID.com Server engine is then free to perform various functions, such as, for example, validating the 3xID key value associated with an incoming email, and sending it to a recipient using the internet. Other functions include those constituting a Logic and a Storage level.

Figure 18:
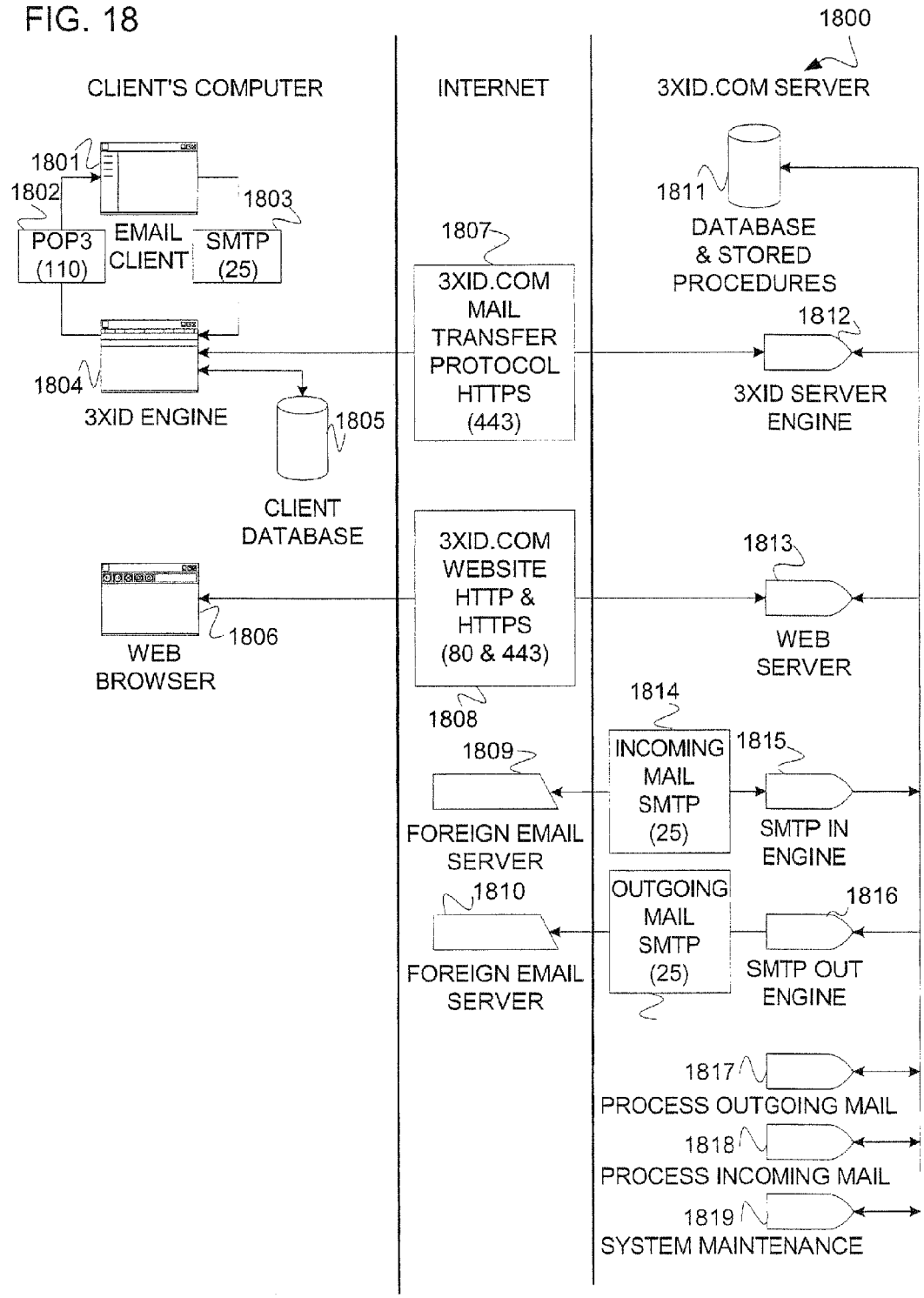
FIG. 18 is a block diagram of a schema 1800 illustrating the various 3xID.com server and client applications and the protocols used by both to exchange data.

FIG. 18 describes a schema 1800 illustrating the various 3xID.com server and client applications and the protocols used by both to exchange data. As a threshold matter, in some embodiments, as described above, certain distributive programming protocols such as SOAP, COBRA or DCOM are utilized to allow for remote procedure calls across a network such as the internet. As a part of these protocols, certain sockets or APIs are utilized to identify specific remote procedures. In some embodiments, an API is identified by a combination of IP address, a protocol, and a port number. In some embodiments, port numbers that are utilized include: 20, 21, 25, 80, 109, 110, 143, 443, 465, 993, and 995. These port numbers can be used, in some embodiments, to identify certain procedures, remote or native, handling protocols such as SMTP, IMAP, POP2, POP3, HTTP, HTTPS or other protocols known in the art. (See id.) In some embodiments, as a prerequisite to the use of any of these protocols, a TCP/IP or UDP/IP connection is established. The exact port number that can be used will, in some embodiments, be determined based upon the needs of the particular software developer implementing an embodiment of the present invention.

In some embodiments, an email client 1801 sends email utilizing the Interface level of a 3xID engine 1804 via a procedure using a SMTP and port 25. In some embodiments, this 3xID engine 1804 is operatively coupled to a Storage level in the form of a client database 1805 through various protocols (e.g., JDBC) described above. Further, in some embodiments, an email client 1801 retrieves emails through a 3xID engine via a procedure using POP3 and port 110. In still further embodiments, email can be retrieved using a POP2 protocol and port 109, IMAP4 and port 143, IMAP over a secure sockets layer (SSL) and port 993, or POP3 over SSL and port 995. In addition to procedures related to email, procedures related to file transfer can also be implemented, procedures that use ports 20 & 21.

In some embodiments, the above procedures utilize HTTP or HTTPS to send or receive emails. In some embodiments, procedures utilizing HTTP use port 443, whereas procedures utilizing HTTPS use port 80. In still other embodiments, other ports are used for HTTP or HTTPS. In some embodiments, the 3xID engine 1804 communicates with the Interface level of a 3xID.com Server engine 1812, which, in turn, is connected to a Storage level 1811. This 3xID.com Server engine 1812 is, in turn, operatively coupled to an Enterprise Server Application 1813 that, in some embodiments, can function as a web server.

In still other embodiments, web-based email is available to a 3xID subscriber wherein a 3xID subscriber uses a web browser 1806 and HTTP or HTTPS 1808 to retrieve emails from or send emails to the 3xID.com Server engine 1812 via an Enterprise Server Application 1813. Using this web-based email, a 3xID subscriber accesses a 3xID website, provides a user name and password, and is then free to send and receive emails using a 3xID.com server, as they would normally do using a computer system with an email client and the 3xID engine installed. More to the point, in some embodiments, the 3xID.com server provides much of the functionality normally implemented by the 3xID engine, including the creation of 3xID key values, insertion of 3xID key values in the local potion of an email address and the sending of these emails.

In some embodiments, the 3xID.com Server engine 1812 is operatively coupled to various other procedures that allow it to have additional functionality. In some embodiments, an SMTP in-engine 1815 and SMTP out-engine 1816 are operatively coupled to the 3xID.com Server engine 1812. These two engines (i.e., Nos. 1815 & 1816) allow the 3xID.com Server engine 1812 to process SMTP requests from foreign mail servers 1809 and 1810. In some embodiments, these two engines (i.e., Nos. 1815 & 1816) process mail requests form other 3xID.com servers. Additionally, these other procedures include functions for processing outgoing mail 1817, one or more functions 1818 for processing incoming mail, and various system-maintenance functions 1819.

Figure 19:
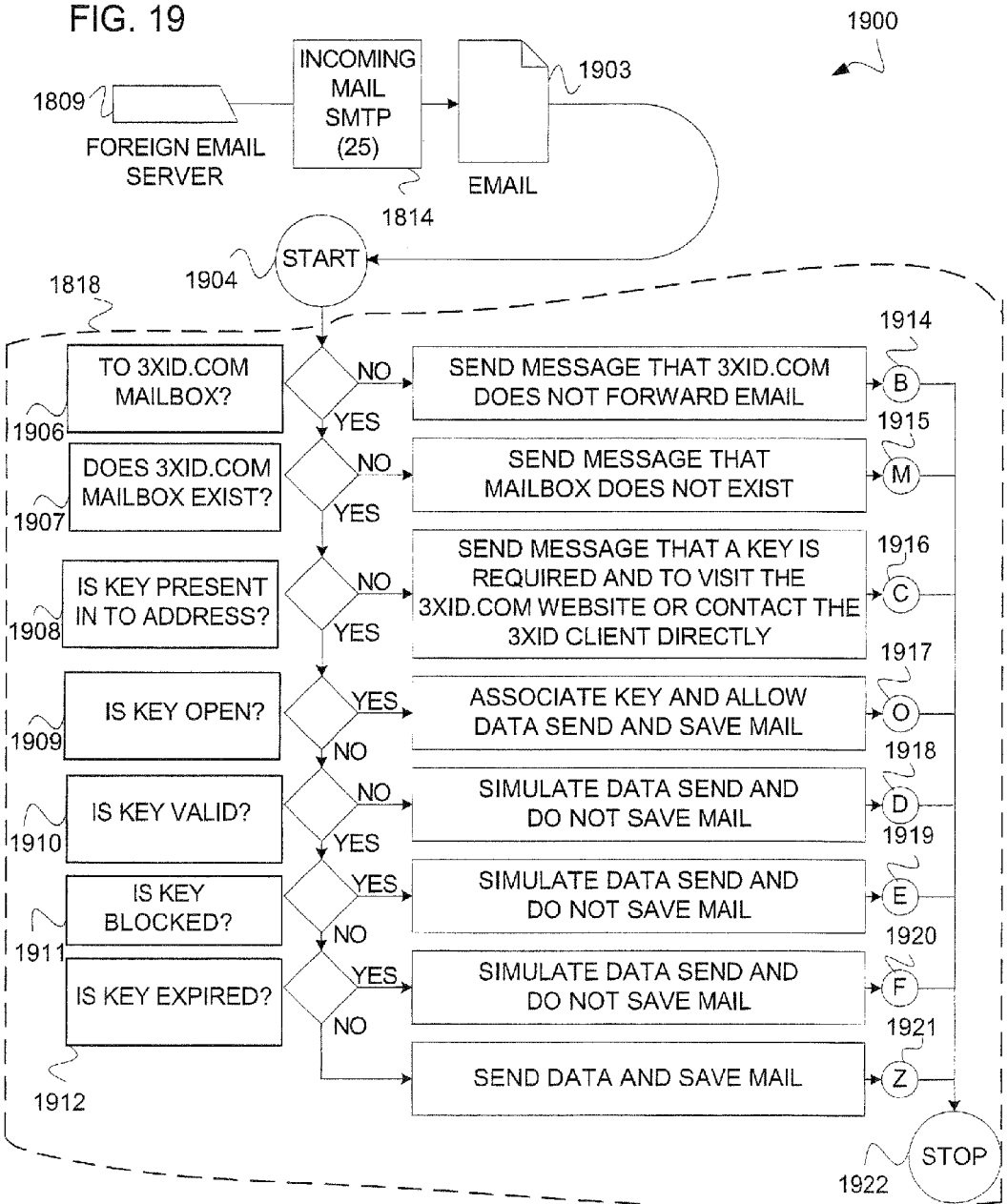
FIG. 19 is flow chart 1900 describing one aspect of the Logic level associated with the 3xID.com server and, in particular, the one or more functions 1218 used to process incoming email.

FIG. 19 is flow chart 1900 describing one aspect of the Logic level associated with the 3xID.com server and, in particular, the one or more functions 1818 used to process incoming email. In some embodiments, a foreign mail server 1809 sends an email 1903 to the 3xID.com servers via an SMTP port 25. Once the email 1903 is received, one or more functions 1818 are initiated via a start 1904. First, as described below, a parsing routine extracts the sender's email address, and then further extracts the local part, and 3xID key value, if any, from the sender's email address. Once parsed, in some embodiments, the extracted email-address information is passed through a series of branch or case statements (i.e., collectively known as a condition statement or condition statements) used to test for the existence or non-existence of certain types of information. The order of execution or particular use of these conditional statements is dependent upon the needs of the individual developer implementing this portion of the Logic level.

In some embodiments, a conditional statement 1906 is implemented wherein it is determined whether the incoming email 1903 is being sent to a 3xID.com mailbox. If the incoming email 1903 is being sent to 3xID.com mailbox, then the sender is prompted that 3xID.com does not forward email messages. (This is an informational message only, and does not affect the email.) Subsequently, a counter process "B" 1914 is executed which counts and records the number of times this conditional statement 1906 is executed. In some embodiments, this conditional is not implemented. In some embodiments, as discussed elsewhere, no message is sent to the sender, while in some embodiments a time-delayed message is sent (see below). In the alternative, if the email is not being sent to a 3xID.com mailbox, then the email 1903 is passed to the next conditional statement.

In some embodiments, a condition statement 1907 is implemented wherein it is determined whether the mailbox exists to which the incoming email 1903 is addressed. If the email box exists, then the email 1903 is passed to the next conditional statement. If, however, the mailbox does not exist, the sender is prompted with a message stating that the recipient email box does not exist in the system. Subsequently, a counter process "M" 1915 is executed that counts and records the number of times condition statement 1907 is executed. In some embodiments, as discussed elsewhere, no message is sent to the sender, while is some embodiments a timed acknowledgment is sent (see below). Alternatively, if the mailbox does exist on the 3xID.com server, then the email 1903 is passed to the next conditional statement.

In some embodiments, a condition statement 1908 is implemented wherein it is determined whether a 3xID key value is present in the "From" field of the header in email 1903. If a 3xID key value is not present, then the sender is prompted with a message telling the sender that a key value is required, and that the sender needs to visit the 3xID.com website to obtain a 3xID key value. Subsequently, a counter process "C" 1916 is executed that counts and records the number of times condition statement 1908 is executed. In some embodiments, as discussed elsewhere, no message is sent to the sender, while in some embodiments a timed acknowledgment is sent (see below). If, however, the 3xID key value is present in the "From" field, then the email 1903 is sent on to the next conditional statement. In some embodiments, the entire email 1903 is passed on to the next conditional statement, whereas in other embodiments, only the parsed portions (e.g., 3xID key value, local name) are passed on to the next conditional statement. The decision as to whether to pass the entire email 1903 or just its header can be determined based upon the need of the particular individual implementing an embodiment of the present invention.

In some embodiments, a condition statement 1909 is implemented wherein it is determined whether the 3xID key value contained in the "From" field of the header in the email 1903 is an Open Key. If the key value is an Open Key value, then, in some embodiments, the Open Key value will be associated with a particular sender, the email 1903 sent to the 3xID subscriber, and the email 1903 stored into the Storage level 1811. Subsequently, a counter process "O" 1917 is executed that counts and records the number of times conditional statement 1909 is executed. Alternatively, if the key is not a "Public Key", the email message 1903 is sent on to the next conditional statement.

In some embodiments, a condition statement 1910 is implemented wherein it is determined whether a valid 3xID key value is present in the "From" field of the header in email 1903. If a valid 3xID key value is not present, then a simulated send operation is performed wherein the sender is prompted with a pseudo message showing that the message has been successfully sent. Subsequently, a counter process "D" 1918 is executed that counts the number of times conditional statement 1910 is executed. In some embodiments, as discussed elsewhere, no pseudo message is sent to the sender, while in some embodiments a timed acknowledgment is sent (see below). If, however, a valid 3xID key value is present in the "From" field, then the email 1903 is sent on to the next conditional statement.

In some embodiments, a conditional statement 1911 is implemented wherein it is determined whether the 3xID key value present in the "From" field of the header in email 1903 has been blocked. If a 3xID key value has been blocked, then a simulated send operation is performed wherein the sender is prompted with a pseudo message showing that the message has been successfully sent. Subsequently, a counter process "E" 1919 is executed counting the number of times conditional statement 1911 is executed. In some embodiments, as discussed elsewhere, no pseudo message is sent to the sender, while in some embodiments a timed acknowledgment is sent (see below). If, however, the 3xID key value is present in the "From" field has not been blocked, then the email 1903 is sent on to the next conditional statement.

In some embodiments, a conditional statement 1912 is implemented wherein it is determined whether the 3xID key value present in the "From" field of the header in email 1903 has expired. If a 3xID key value has expired, then a simulated send operation is performed wherein the sender is prompted with a pseudo message showing that the message has been successfully sent. Subsequently, a counter process "F" 1920 is executed counting the number of times conditional statement 1912 is executed. In some embodiments, as discussed elsewhere, no pseudo message is sent to the sender, while in some embodiments a timed acknowledgment is sent (see below). If, however, the 3xID key value has not expired, then the email 1903 is saved and sent on to the recipient.

The logic described in flow chart 1300 can be implemented in an object-oriented programming language such as C++, Java™, C#™, or some other suitable language by one knowledgeable in the art.

In at least one embodiment, a parsing routine is written in the Java™ programming language to allow for the parsing of the header of incoming email messages, such as email 1303, using the SMTP. In some embodiments, another object-oriented programming language such as C#™, C++, or other suitable programming language can be used. The following is a pseudo code example of this parsing routine:

```
Module m_validateExpressions
    'Public expression_email_address As New Regex("^([\w-\.]+)@((\[[0-9]{1,3}\.[0-
9]{1,3}\.[0- 9]{1,3}\.)|(([\w-]+\.)+))([a-zA-Z]{2,4}|[0-9]{1,3})(\]?)$",
    RegexOptions.Compiled)
    Public r_email As New Regex("^<(?<email>([\w-\.]+)@((\[[0-9]{1,3}\.[0-
```

```
9]{1,3}\.)|(([\w-]+\.)+))([a-zA-Z]{2,4}|[0-9]{1,3})(\]?))>$|^(?<email>([\w-\.]+)@((\[[0-
9]{1,3}\.[0-9]{1,3}\.[0-9]{1,3}\.)|(([\w-]+\.)+))([a-zA-Z]{2,4}|[0-9]{1,3})(\]?))$",
    RegexOptions.Compiled)
Public r_email_form_1 As New Regex("^(?<mailbox>\w+)_(?<key>\S+)@3xID.com",
    RegexOptions.Compiled + RegexOptions.IgnoreCase)
Public r_email_form_2 As New Regex("^(?<mailbox>\w+)-(?<key>\S+)@3xID.com",
    RegexOptions.Compiled + RegexOptions.IgnoreCase)
Public r_email_form_3 As New
    Regex("^(?<mailbox>\w+)_(?<key>\S+)@THREExID.com", RegexOptions.Compiled +
    RegexOptions.IgnoreCase)
Public r_email_form_4 As New Regex("^(?<mailbox>\w+)-
    (?<key>\S+)@THREExID.com", RegexOptions.Compiled + RegexOptions.IgnoreCase)
Public r_email_form_5 As New Regex("^(?<mailbox>\w+)@3xID.com",
    RegexOptions.Compiled + RegexOptions.IgnoreCase)
Public r_email_form_6 As New Regex("^(?<mailbox>\w+)@THREExID.com",
    RegexOptions.Compiled + RegexOptions.IgnoreCase)
Public r_email_form_7 As New Regex("^(?<mailbox>\w+)@(?<host>\S+)",
    RegexOptions.Compiled + RegexOptions.IgnoreCase)
Public r_email_form_3xID_error As New Regex("@3xID.com|@THREExID.com",
    RegexOptions.Compiled + RegexOptions.IgnoreCase)
Public c_HELO As New Regex("HELO( (?<host>.+))?", RegexOptions.Compiled +
    RegexOptions.IgnoreCase)
Public c_EHLO As New Regex("EHLO( (?<host>.+))?", RegexOptions.Compiled +
    RegexOptions.IgnoreCase)
Public c_DATA As New Regex("DATA", RegexOptions.Compiled +
    RegexOptions.IgnoreCase)
Public c_RSET As New Regex("RSET", RegexOptions.Compiled +
    RegexOptions.IgnoreCase)
Public c_NOOP As New Regex("NOOP", RegexOptions.Compiled +
    RegexOptions.IgnoreCase)
Public c_QUIT As New Regex("QUIT", RegexOptions.Compiled +
    RegexOptions.IgnoreCase)
Public c_VRFY As New Regex("VFRY", RegexOptions.Compiled +
    RegexOptions.IgnoreCase)
Public c_EXPN As New Regex("VFRY", RegexOptions.Compiled +
    RegexOptions.IgnoreCase)
Public c_HELP As New Regex("HELP", RegexOptions.Compiled +
    RegexOptions.IgnoreCase)
Public c_SEND_FROM As New Regex("SEND FROM: ?.+", RegexOptions.Compiled +
    RegexOptions.IgnoreCase)
Public c_SOML_FROM As New Regex("SOML FROM: ?.+", RegexOptions.Compiled +
    RegexOptions.IgnoreCase)
Public c_SAML_FROM As New Regex("SAML FROM: ?.+", RegexOptions.Compiled +
    RegexOptions.IgnoreCase)
Public c_MAIL_FROM As New Regex("MAIL FROM:( ?(?<email>.+))",
    RegexOptions.Compiled + RegexOptions.IgnoreCase)
Public c_RCPT_TO As New Regex("RCPT TO:( ?(?<email>.+))",
    RegexOptions.Compiled + RegexOptions.IgnoreCase)
Public r_size_exists As New Regex("SIZE=", RegexOptions.Compiled +
    RegexOptions.IgnoreCase)
Public r_size As New Regex("SIZE=(?<size>[0-9]+\b)", RegexOptions.Compiled +
    RegexOptions.IgnoreCase)
Public r_body_exists As New Regex("BODY=", RegexOptions.Compiled +
    RegexOptions.IgnoreCase)
Public r_body As New Regex("BODY=(?<body>7BIT|8BITMIME)\b",
    RegexOptions.Compiled + RegexOptions.IgnoreCase)
End Module
```

In some embodiments, the 3xID key values are automatically stripped out of the local portion of the email address, prior to the email being forwarded. In one embodiment, prior to a validated email containing a valid 3xID value being sent to a recipient the 3xID key value is stripped out of the local portion of the email prior to being sent to the ultimate recipient. In such an embodiment, the recipient merely sees a sending email address in the "From" field of the email header.

In some embodiments, the following database tables are implemented at a Storage level 1211 using the below-described data types:

email_in

| | |
|---|---|
| email_in_ID | integer |
| email_in_pushed_to_client | bit |
| email_in_IP_address | nvarchar(20) |
| email_in_user_ID | integer |
| email_in_validation_message | nvarchar(100) |
| email_in_to | varchar(250) |
| email_in_cc | varchar(250) |
| email_in_bcc | varchar(250) |
| email_in_from | varchar(250) |
| mail_in_date | datetime |
| email_in_subject | nvarchar(250) |
| email_in_message | ntext |
| email_in_blocks | bit NOT NULL |
| email_in_message_size | bigint NOT NULL |
| PRIMARY KEY(email_in_ID) | | email_out

| | |
|---|---|
| email_out_ID | integer |
| email_out_user_ID | integer |

-continued

| | |
|---|---|
| email_out_send_date | datetime |
| email_out_to | ntext |
| email_out_cc | ntext |
| email_out_bcc | ntext |
| email_out_subject | nvarchar(250) |
| email_out_message | ntext |
| email_out_delivery_status_ID | bit |
| email_out_reject_blocks | bit |
| PRIMARY KEY(email_out_ID) | |
| key | |
| key_ID | integer |
| key_user_ID | integer |
| key_block | bit NOT NULL |
| key_creation_date | datetime |
| key_expiration_date | datetime |
| key_modification_date | datetime |
| key_open | bit NOT NULL |
| key_key | varchar(50) NOT NULL |
| key_email_address | char (250) |
| key_sender_created | bit NOT NULL |
| key_total_emails_received | integer |
| key_total_emails_sent | integer |
| key_total_emails_blocked | integer |
| PRIMARY KEY(key_ID) | |
| SMTP_In | |
| SMTP_In_ID | integer |
| SMTP_In_message_ID | char(40) |
| SMTP_In_received_date | datetime |
| SMTP_In_complete | integer |
| SMTP_In_to_addresses | ntext |
| SMTP_In_body | ntext |
| PRIMARY KEY(SMTP_IN_ID) | |
| SMTP_Out | |
| SMTP_Out_ID | integer |
| SMTP_Out_message_ID | char(40) |
| SMTP_Out_user_ID | integer |
| SMTP_Out_to_address | char(250) |
| SMTP_Out_from_address | char(250) |
| SMTP_Out_body | ntext |
| SMTP_Out_send_in_progress | integer |
| SMTP_Out_attempts | integer |
| SMTP_Out_next_attempt | datetime |
| SMTP_Out_dns | nvarchar(300) |
| SMTP_Out_sent_or_failed | integer |
| PRIMARY KEY(SMTP_OUT_ID) | |
| user1 | |
| user_ID | integer |
| user_user_ID | nvarchar(64) NOT NULL |
| user_pwd | nvarchar(25)NOT NULL |
| user_user_account_type_ID | integer |
| user_date_of_last_log_in | datetime |
| user_date_of_last_failed_log_in_attempt | datetime |
| user_failed_log_in_attempt_count | smallint |
| user_suppress_public_directory | bit |
| user_locked | bit |
| user_locked_expiration | datetime |
| user_cancelled | bit |
| user_suspeneded | bit |
| user_account_expiration_date | datetime |
| user_name_last | nvarchar(25) |
| user_name_first | nvarchar(20) |
| user_name_middle | nvarchar(10) |
| user_name_full | nvarchar(47) |
| user_address_1 | nvarchar(40) |
| user_address_2 | nvarchar(40) |
| user_address_city | nvarchar(30) |
| user_address_state | nvarchar(20) |
| user_address_zip | nvarchar(15) |
| user_country_ID | integer |
| user_phone_home | nvarchar(25) |
| user_phone_work | nvarchar(25) |
| user_phone_cell | nvarchar(25) |
| user_phone_fax | nvarchar(25) |
| user_DOB | datetime |
| user_pay_credit_card_type_ID | integer |
| user_pay_credit_card_number | nvarchar(25) |

-continued

| | |
|---|---|
| user_pay_credit_card_exp_date_month | smallint |
| user_pay_credit_card_exp_date_year | smallint |
| user_pay_credit_card_security_digits | nvarchar(10) |
| user_pay_credit_card_billing_phone | nvarchar(15) |
| user_pay_credit_card_billing_name | nvarchar(50) |
| user_pay_credit_card_billing_address_1 | nvarchar(40) |
| user_pay_credit_card_billing_address_2 | nvarchar (40) |
| user_pay_credit_card_billing_city | nvarchar(30) |
| user_pay_credit_card_billing_state | nvarchar(20) |
| user_pay_credit_card_billing_zip | nvarchar(15) |
| user_pay_check_account_number | nvarchar(25) |
| user_pay_check_routing_number | nvarchar(25) |
| user_pay_check_bank_name | nvarchar(50) |
| user_pay_check_name | nvarchar(50) |
| user_pay_check_address_1 | nvarchar(40) |
| user_pay_check_address_2 | nvarchar(40) |
| user_pay_check_address_city | nvarchar(30) |
| user_pay_check_address_state | nvarchar(20) |
| user_pay_check_address_zip | nvarchar(15) |
| user_picture_1 | image |
| user_picture_2 | image |
| user_picture_3 | image |
| user_picture_approved | bit |
| user_forward_email_address | nvarchar(250) |
| PRIMARY KEY(user_ID) | |

In some embodiments, other data types may be used such as: BLOB, CLOB, strings, doubles, floats, or other suitable data types known in the art may be used. (See *The Fundamentals of Database Systems* 3rd Edition, Remez Elmasri & Shamkant B. Navathe, Addison-Wesley, 2000.) In some embodiments, the data type is a user-defined data type.

Key Verification and Related Functionality

Photo Array for 3XID

In still other embodiments, a publicly created 3xID key is generated, using a publicly generated key system. In this embodiment, a sender wishes to email a subscriber and does not already have a key. The sender can obtain a key himself or herself, without any assistance from the subscriber, if the sender can prove the sender knows the subscriber. This process is dependent on the subscriber uploading one or more images of the subscriber's face, and a sender successfully identifying the face pictures of the subscriber, by clicking on the correct image with the sender's mouse, or selecting via another input device (e.g., light pen, touch screen or other suitable device), from an array of thirty-six images, three times in a row. The images are composed of the subscriber and thirty-five other randomly chosen people. The size and number of matrices used in this embodiment are not limited to that described above, or depicted below in FIGS. 20 and 21. In some embodiments, larger matrices may be used, making it tougher for persons to gain unauthorized access to a 3xID key. For example, in some embodiments, three or more 10×10 matrices might be appropriate. Again, in some embodiments, three or more 20×20 matrices might be appropriate. In addition, in some embodiments, three or more differently sized matrices may be appropriate. In some embodiments, the pictures used in the above-described matrices are altered (e.g., different backgrounds, shading and other slight changes are made to the pictures) such that a slightly different decision need be made as to which person needs to be picked. The appropriate size and number of matrices can be determined through modeling and/or empirical testing.

In some embodiments, senders that unsuccessfully identify the subscriber's picture in the above-referenced matrices three times receive a bogus or bad key that will never allow email to be authenticated as non-UBE, while successful senders receive a key that will authenticate email as non-UBE.

In some embodiments, essential to this scheme is the idea that the sender seeking a key will never be told whether their email is actually being received by the subscriber or is being deleted as UBE. By telling the sender if their key works, this would allow senders to try every possible combination until a successfully generated key has been made. While the number of possible combinations depends on the size of the image array, at thirty-six images times three the odds of a correct guess are 1 in 46,656.

In some embodiments, two-way picture verification exists, whereby parties can send each other email based upon their mutual identification of each other in one or more photo matrices of various sizes. For example, in one embodiment, the sender of an email will review a number of photo arrays to identify the correct picture of an individual. Once an individual is correctly identified, a sender will be provided a 3xID key value to use to send emails to the identified person. In some embodiments, a 3xID subscriber will use a photo array, as described above, to identify an individual from whom they would like to receive email. Once successfully identified, the person will be automatically sent a valid 3xID key value from the 3xID subscriber.

Figure 20:
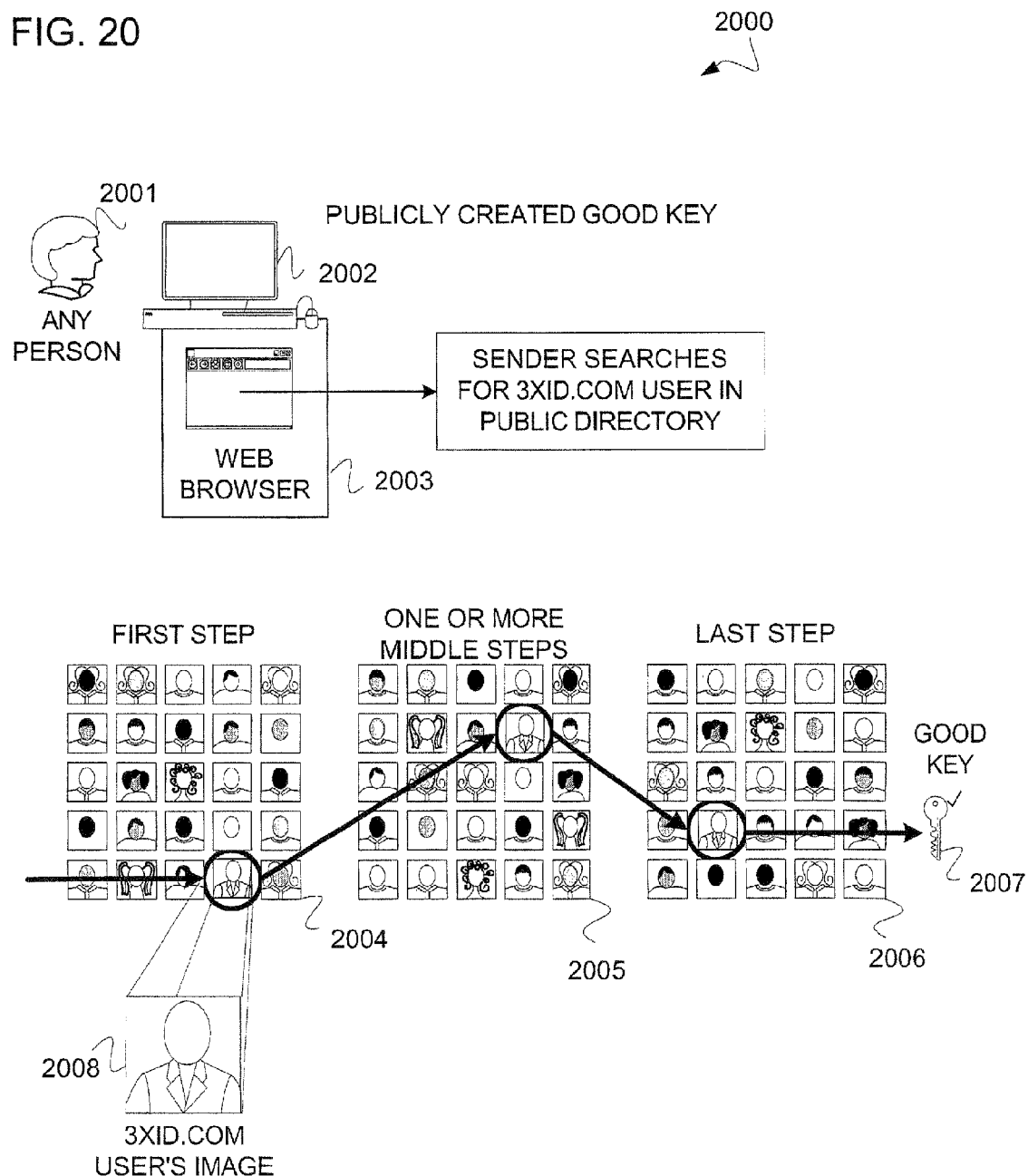
FIG. 20 is a schema 2000 that illustrates the successful use of a system of matrices to obtain a publicly created key.

FIGS. 20-21 depict the successful and unsuccessful creation of a 3xID key using the Publicly Created Key system. FIG. 20 is a schema 2000 describing the generation of a good key using the above-described publicly generated key system. In some embodiments, a person (any person) 2001 using a computer system 2002 with a web browser 2003 searches an on-line public directory of images set in a matrix configuration. In some embodiments, a matrix 2004, 2005, and 2006 are searched for the image of a particular hypothetical 3xID subscriber whom the person 2001 has seen before. After correctly identifying this person's 3xID.com user's image 2008, the person 2001 will be provided a good key 2007 to use to send emails to the identified 3xID subscriber.

FIG. 21 is a schema 2100 describing the generation of a bad key 2104. In one example embodiment, the person 2001 selects different images of a hypothetical 3xID subscriber from a matrix 2101, 2102 and 2103. Due to this failed selection, the person 2001 is provided a bad key 2104. Of note, is the fact that, in some embodiments, the person 2001 is not informed that the key they have been provided is a good key 2007 or a bad key 2104. Rather they are just provided a 3xID key value.

In some embodiments, the above-described matrices are implemented, for example, using ASP™ or JSP™ and related technology. In some embodiments, VBScript™ or JavaScript is used to provide dynamic functionality to HTML-based ASPs, where certain functions are executed utilizing a GUI and a mouse or some other suitable input device. For example, a user may use a mouse to select a particular photo in a matrix displayed in a web browser capable of interpreting the ASPs and the HTML or XML contained therein. In some embodiments, these photos can be in the form of objects in a Graphics Interchange Format (GIF), or Joint Photographic Experts Group (JPEG) format, or other suitably formatted objects, embedded in HTML. Once a photo is selected, a function written in VBScript™ records the selection and determines if the selection is similar to previous photo selections. If the selections are the same and also the correct selections, then as described elsewhere a 3xID key will be provided to the user. If the selections are not the same, then the user will receive an invalid 3xID key value. In some embodiments, the user will be prompted with an error message upon the unsuccessful selection of a photo. The use of VBScript™, JavaScript, ASP™ or JSP™ is well known in the art. (See *Designing Active Server Pages*, Scott Mitchell, O'Reilly Media, Inc., 2000; *JavaServer Pages 3rd Edition*, Hans Bergsten, Reilly Media 2003.)

Photo Array Generally

In some embodiments, the above-described photo array can be used for purposes, for example, other than verifying the recipient of an email. In some embodiments, a photo array is described that allows goods and services to be purchased based upon distinguishing a particular individual's picture from another individual's picture as represented in an online photo array. In some embodiments, an array of photos as described above is displayed to a user. In some embodiments, these photos are displayed through the use of a browser application displaying various objects in the form of, for example, GIF or JPEG objects, or other suitably formatted objects, embedded in HTML. A user is able to select a single image based upon the similarities between the individual depicted in the image and the user's recollection of an individual. In some embodiments, the user will be prompted to make multiple selections of the correct individual's picture or pictures. Once correctly selected, a user is able to then purchase goods and services for the person depicted. In some embodiments, the act of selecting is performed via a mouse or other input device (e.g., light pen, touch screen or other suitable device). For example, by selecting one or more of the correct pictures from a photo array, one could be able to purchase a book, money order, compact disc, or the like for the person selected.

In some embodiments, once a user correctly selects a recipient's picture, the user is prompted with, for example, an Applet displayed in the browser window within which they had initially selected the correct picture. Through this Applet, the user may, in some embodiments, be able to purchase a good or service for the recipient. In addition, in some embodiments, this Applet will be able to provide a mechanism through which a user may be able to make a payment for the selected good or service. For example, in some embodiments, an Applet will be displayed with one or more matrices containing photo in each cell of a particular matrix. The user will be able to select a photo in each of the displayed matrices. Where a predetermined number of correct and/or similar photos are selected, the user will be prompted with a GUI (e.g., an Applet) that will allow them to select certain goods or services for purchase. The use of Applet's as a browser-based GUI is well known in the art. (See *Java How to Program* $3^{rd}$ *Edition*, H. M. Deitel & P. J. Deitel, Prentice Hall, 1999.) In still other embodiments, a C#™ or VBScript™ form embedded in an ASP™ serves as the GUI from which to select photos, and pay for a good or service.

In some embodiments, once the payment is made through the GUI an on-line payment processor takes the data entered into the GUI and processes it in a manner known in the art. (See *Electronic Payment Systems for E-Commerce 2nd Edition*, Donald O'Mahony, Michael A. Peirce, Hitesh Tewari, O'Mahony Donal, Artech House Publishers, 2001.) Once the payment is successfully made and verified, the goods or services are provided to the recipient.

Timed Acknowledgment

In some embodiments, the 3xID.com server provides a timed response to a successful or unsuccessful email received by a subscriber. In some embodiments, when an email is successfully received by a recipient a notice is sent notifying the non-subscribing sender of the receipt of the email. In some embodiments, no acknowledgment is provided. In some embodiments, this acknowledgement is timed such that regardless of whether the email was successfully sent or unsuccessfully sent, the response time is the same. In some embodiments, the response itself can be in the form of providing an email confirmation, providing a valid or invalid key value, or providing nothing.

In some embodiments, a procedure written using an object-oriented programming language is implemented whereby once an email is determined to be valid or invalid (see FIG. 13 above), a timer function is called to ensure that the execution time for the function or series of functions used to send a response remains constant or nearly invariable. In some embodiments, this time function is a loop structure the iterates some number of times prior to the sending of the response, while in order embodiments it is an actual time function as is known in the art. (See *Java How to Program* 3rd Edition, H. M. Deitel & P. J. Deitel, Prentice Hall, 1999.) In some embodiments, this response time, and associated functions, can be adjusted for network traffic conditions such that regardless of the traffic conditions the response time will be the same. Where the response time is adjusted to meet network conditions, network traffic will be polled, and where little network activity exists, time will be added to the response time to ensure that response time is always consistent. In still further embodiments, where polling reveals a large amount of network traffic, the time procedure will preempt the processor to allow all processor resources to be devoted to execution of the time functions, such that the additional time to send the response will be added from the delay due to network traffic. Polling is a concept known in the art and common to, for example, the code sensing multiple access (CSMA) paradigm. (See *Computer Networking: A Top-Down Approach Featuring the Internet* 2nd Edition, James F. Kurose and Keith W. Ross, 2003.) Concepts such as little network activity and a large amount of network activity can be determined though empirical testing and/or modeling.

Selling of Advertisement

In some embodiments, functionality is implemented in the 3xID.com server whereby when an email is received form a 3xID subscriber, the 3xID.com server searches the body and/or subject heading of the email looking for certain key words. These key words can, in some embodiments, relate to certain goods and services, such as, for example "vacations", "cars", "music", or "attorney". In addition some embodiments will allow for misspelled keywords that match accidentally misspelled words in an email message. As well, other embodiments will include keywords with common typographical errors that match common typographical errors made when a person types an email message. Once a key word is discovered, a banner advertisement is inserted into the email by the 3xID.com server relating to the key word. For example, if the email contained a reference to "vacations", a banner advertising a commercial air carrier may be inserted. Again, if the email contains a reference to "cars" a banner for a nationally recognized automobile manufacturer may be inserted into the email. In some embodiments, not only are banners inserted into email bodies and subject lines relating to email being sent by 3xID subscribers to non-subscribers, but, in some embodiments, a 3xID subscriber's use of these key words is recorded and stored into a database. Once stored, this database is later queried and emails sent to the 3xID subscriber will contain an advertisement banners related to certain products or services.

In some embodiments, these banner advertisements include both text, graphical images, and sound. In some embodiments, these graphical images are still images (e.g., JPEG, GIF), while in other embodiments they are moving images executed using, for example, a Moving Pictures Experts Group (MPEG) format embedded in the email. In some embodiments, the sound is stored and played from files including, for example, Waveform Audio format files (WAV). In some embodiments, a Flash™ file will be embedded in the email. In some embodiments, plain HTML text will be embedded in the email. In some embodiments, a JavaScript or VBScript™ application is used to display the text, graphics and sound associated with the banner advertisement. In some embodiments, some other scripting technology is utilized.

Online Registration & Purchasing

In some embodiments, a method doing business online is described wherein one or more persons could subscribe (i.e., become a subscriber) to the present system and method by creating an account online and making a subscription payment online in the form of a monetary payment. Once an individual becomes a subscriber, in some embodiments, the individual would be free to send and receive email using the above-described system and method.

In some embodiments, a person using a web-browser application residing on a client computer retrieves a web page written in HTML residing on a web server using, for example, a combination of the TCP/IP protocol and HTTP. In some embodiments, various objects written in Java Script, VB Script or some other suitable language are embedded within the HTML to make the content displayed in the HTML dynamic. These objects can include, in some embodiments, text boxes, radio buttons, hyperlinks, check boxes, drop-down menus or other suitable objects that allow for data I/O to occur. This web server is, in turn, in some embodiments, operatively connected to an application server. The various types of web-server and application-server platforms have been described above, and include, for example, Apache™/Apache™ Tomcat web server platform and the J2EE™ Application Server.

In some embodiments, once this web page is retrieved, a person is prompted to input data relating to setting up an account or subscription to the above-described system and method. For example, in some embodiments, a person is prompted to provide the email address from which they will be sending email (e.g., johndoe@www.mailcompany.com). Additionally, a person may, in some embodiments, be prompted to supply personal information relating to name, address, telephone number, or an alternative email address. In addition to personal information, in some embodiments, a person may be asked to supply the email addresses for persons to whom they regularly send emails (i.e., recipient information). In some embodiments, once this personal information and recipient information is supplied, a person is prompted for payment information. Payment information can include credit card information, check number and routing information, and other information commonly used in the art to secure an online payment. (See *Electronic Payment Systems for E-Commerce* 2nd Edition, Donal O'Mahony, Michael A. Peirce, Hitesh Tewari, O'Mahony Donal, Artech House Publishers, 2001.) In some embodiments, payment information will include information relating to the duration of the subscription such as, for example, one month, three months, six moths or some other suitable time period. In some embodiments, the subscription-duration information is stored into a database table, and once the subscription duration expires the subscription, in some embodiments, will be automatically renewed, or, in some embodiments, the subscriber will be sent an email notification stating that a renewal needs to take place. In some embodiments, the longer the duration of the subscription, the higher the cost of the subscription. Once the payment information is provided, it is processed and a payment is made. In some embodiments, a record of the successful payment (i.e, a receipt) will be sent to the subscriber's email address. This receipt will contain account information in addition to the amount of the payment for the subscription.

Upon verification of payment, in some embodiments, a person becomes a subscriber to the above-outlined system and method. Once a person becomes a subscriber the personal data and recipient information they provided is stored to one or more database tables. In some embodiments, these tables are created and managed using SQL in combination with a database platform such as MySQL™, SQLServer™ or some other suitable database platform. In some embodiments, this database table will associate, for example, the subscriber's email address with the email addresses disclosed as recipient information (i.e., recipient email addresses). In some embodiments, a 3xID key value will be associated with each of these recipient email addresses. As described elsewhere, through associating a 3xID key value with a recipient email address, a non-subscriber to the system will be free to send email to a subscriber.

In some embodiments, upon verification of payment a subscriber will be able to download a client application (i.e., a 3xID Engine) as an executable (e.g., as an .exe file) that will enable them to send and receive email using the above-described system and method. As described elsewhere this client application will interface with an existing email client and serve as an intermediary between the existing email client and a mail server. In some embodiments, this client application will automatically generate a 3xID key value (e.g., ABC123) for each new out-going email (e.g., johndoe_abc123@www.mailcompany.com) where the recipient has never received email form the subscriber. In some embodiments, where the recipient has received email from the subscriber in the past, the client application will automatically insert a previously used key value into the local part of the email address. In some embodiments, these previously used key values are maintained within a native database that is a part of the client application. In some embodiments, these previously used key values are a part of the email addresses maintained by the email client within a database. In still further embodiments, the 3xID key value is manually generated and entered into the local portion of the email address. (See above discussion of "Assigned" keys and "Open" keys and "Publicly Created" keys.)

In some embodiments, subscribers will have their names placed into a public directory fully accessible to anyone connected to the internet, while, in some embodiments, they will have the opportunity to opt out of having their name in a public directory. In some embodiments, where their name is in a public directory, the non-subscribing sender will type the name of the subscriber to obtain a Publicly Created Key. In some embodiments, the non-subscribing sender will use the above-described photo array to obtain a key value.

In some embodiments of the present invention, a computerized method for validating the identity of a sender of an email is described, including receiving an email header with an email address, modifying a local part of the email address by affixing a 3xID key value to the local part of the email address, sending an email to a 3xID.com server using the modified email address, validating the identity of a sender of the email, associating the 3xID key value and a recipient email address, removing the 3xID key value where necessary from the email header, storing this association into a database and sending the email on to an ultimate recipient of the email. In some embodiments of the present invention this computerized method also includes generating automatically a 3xID key value and affixing this 3xID key value to the local part of the email address. In some embodiments of the present invention this computerized method also includes generating manually a 3xID key value and affixing this 3xID key value to the local part of the email address. In some embodiments of the present invention this computerized method also includes delimiting a 3xID key value with a character. In some embodiments of the present invention this computerized method also includes hashing the 3xID key value prior to sending the email to a recipient. In some embodiments of the present invention this computerized method also includes encrypting the 3xID key value prior to sending the email to a recipient.

In some embodiments, the present invention is described as a computer-readable medium having instructions stored thereon for causing a suitably programmed computer to execute a method including receiving an email header with an email address, modifying a local part of the email address by affixing a 3xID key value to the local part of the email address, sending an email to a 3xID.com server using the modified email address, validating the identity of a sender of the email, associating the 3xID key value and a recipient email address, removing the 3xID key value where necessary from the email header, storing this association into a database; and sending the email on to an ultimate recipient of the email. In some embodiments, this computer-readable medium having instructions stored thereon further includes a method for generating automatically a 3xID key value and affixing this 3xID key value to the local part of the email address. In some embodiments, this computer-readable medium having instructions stored thereon further includes a method for generating manually a 3xID key value and affixing this 3xID key value to the local part of the email address. In some embodiments, this computer-readable medium having instructions stored thereon further includes a method wherein the 3xID key value is delimited with a character. In some embodiments, this computer-readable medium having instructions stored thereon further includes a method for hashing the 3xID key value prior to sending. In some embodiments, this computer-readable medium having instructions stored thereon further includes a method comprising encrypting the 3xID key value prior to sending.

In some embodiments, a client-server messaging system is described for sending electronic mail including a first mail client operatively connected to a 3xID.com server via an internet, a second mail client operatively coupled to the 3xID.com server via the internet, the first mail client operatively connected to the second mail client through the 3xID.com server and the internet, and a 3xID key value and associated sender and receiver email addresses stored in a database. In some embodiments, a client-server messaging system is described for sending electronic mail including an email transmitter operatively coupled to the first mail client or the second email client. In some embodiments, a client-server messaging system is described for sending electronic mail including an email receiver operatively coupled to the first email client or second mail client. In some embodiments, a client-server messaging system is described for sending electronic mail including a database operatively coupled to the first mail client or the second email client. In some embodiments, a client-server messaging system is described for sending electronic mail including a database operatively coupled to the 3xID.com server. In some embodiments, a client-server messaging system is described for sending electronic mail including an alpha-numeric generator operatively coupled to the first mail client of the second email client. In some embodiments, a client-server messaging system is described for sending electronic mail including the 3xID.com server operatively coupled to a web browser so as to provide a web-based email service. In some embodiments, a client-server messaging system is described for sending electronic mail including an encryption device operatively coupled to the first email client or the second email client.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
    passing a first email message having a header, the header including a first from-email address value in a from-email address field and a to-email address value in a to-email address field, the email message also containing a subscriber-created first sender-validation key value located in the to-email address field of the header of the email message, from a first email-client application program located in a first sender computer system to a second application program that includes a sender-validation-engine and that is also located in the first sender computer system, wherein the first from-email-address value includes a local part, a first domain name and high-level extension;
    using the second application program that includes the sender-validation-engine, encoding the first email message to form a first encoded email message, wherein the encoding adds tags to each of a plurality of parts of the email message;
    transmitting the encoded email message from a first computer to a second computer;
    decoding the encoded email message to reveal an un-encoded version of the email message;
    parsing the un-encoded email message to obtain information including the first sender-validation key value and the from-email address value; and
    checking whether the first sender-validation key value is valid for the first to-email address value and whether the email was sent from the first from-email address, and if so then forwarding the first email to the first to-email address.

2. The method of claim 1, wherein the encoding of the email message includes encoding with XML to form an XML encoded email message.

3. The method of claim 2, further comprising encoding the XML encoded email message with a protocol that allows for remote procedure calls.

4. The method of claim 1, wherein the transmitting is over an internet.

5. A computer-readable storage medium having instructions stored thereon for causing a suitably programmed computer to execute a method comprising:
    passing a first email message having a header, the header including a first from-email address value in a from-email address field and a to-email address value in a to-email address field, the email message also containing a subscriber-created first sender-validation key value located in the to-email address field of the header of the email message, from a first email-client application program located in a first sender computer system to a second application program that includes a sender-validation-engine and that is also located in the first sender computer system, wherein the first from-email-address value includes a local part, a first domain name and high-level extension;
    using the second application program that includes the sender-validation-engine, encoding the first email message to form a first encoded email message, wherein the encoding adds tags to each of a plurality of parts of the email message;
    transmitting the encoded email message from a first computer to a second computer;
    decoding the encoded email message to reveal an un-encoded version of the email message;
    parsing the un-encoded email message to obtain information including the first sender-validation key value and the from-email address value; and
    checking whether the first sender-validation key value is valid for the first to-email address value and whether the email was sent from the first from-email address, and if so then forwarding the first email to the first to-email address.

6. The computer-readable storage medium of claim 5, having additional instructions stored thereon such that the method further comprises:
    decoding the encoded email message to reveal an email message, and wherein the first sender-validation key value includes a 3xID value; and
    parsing the email message to obtain information including the 3xID key value.

7. The computer-readable storage medium of claim 5, wherein the encoding of the email message includes encoding with XML to form an XML-encoded email message.

8. The computer-readable storage medium of claim 7, wherein the encoding of the email message further comprises encoding the XML encoded email message with a protocol that allows for remote procedure calls.

9. The computer-readable storage medium of claim 5, wherein the transmitting is enabled to occur over an internet.

10. The computer-readable storage medium of claim 5, wherein the first application program is an email client.

11. A server-client messaging system comprising:
    a first computer system operatively coupled to an internet, the first computer system including:
        a first email-client application program located in the first sender computer system;
        a second application program that includes a sender-validation-engine, and that is also located in the first sender computer system;
        an encoder in the second application program that includes the sender-validation-engine, wherein the encoder is used to encode a first email having a header, the header including a first from-email address value in a from-email address field and a to-email address value in a to-email address field, the email message also containing a first sender-validation key value located in the to-email address field of the header of the email, from the first email-client application program located in the first sender computer system to the second application program that includes a sender-validation-engine, wherein the first from-email-address value includes a local part, a first domain name and high-level extension and wherein the encoder adds tags to each of a plurality of parts of the email message;

an email client operatively coupled to the encoder and configured to pass the first email to the encoder in the second application program;

a transmitter operatively coupled to the encoder and operable to send the email after the email has been encoded by the encoder;

a second computer system operatively coupled to the internet, the second computer system including:

a receiver operatively couplable to the transmitter across the internet;

a decoder operatively coupled to the receiver and operable to decode the encoded received email to generate an un-encoded version of the email;

a parser operatively coupled to the decoder and configured to obtain information including the first sender-validation key value and the from-email address value from the un-encoded version of the email; and a checker and forwarder configured to check whether the first sender-validation key value is valid for the first to-email address value and whether the email was sent from the first from-email address, and if so then to forward the first email to the first to-email address.

12. The server-client messaging system of claim 11, wherein the first sender-validation key value is a unique value inserted into the the to-email field before the "@" symbol.

13. The server-client messaging system of claim 11, wherein the operable connection to the internet includes a wireless transmission device.

14. The server-client messaging system of claim 11, wherein the operable connection to the internet includes a satellite transmission device.

15. The server-client messaging system of claim 11, wherein the encoder encodes using XML.

16. The server-client messaging system of claim 15, wherein the encoder further encodes using a protocol that allows for remote procedure calls.

17. The server-client messaging system of claim 15, wherein the decoder converts an encoded email message into an un-encoded email message containing a first sender-validation key value.

* * * * *